United States Patent [19]

Clark

[11] Patent Number: 5,307,451
[45] Date of Patent: Apr. 26, 1994

[54] METHOD AND APPARATUS FOR GENERATING AND MANIPULATING GRAPHICAL DATA FOR DISPLAY ON A COMPUTER OUTPUT DEVICE

[75] Inventor: Cary Clark, San Jose, Calif.

[73] Assignee: Apple Computer, Inc., Cupertino, Calif.

[21] Appl. No.: 881,880

[22] Filed: May 12, 1992

[51] Int. Cl.$^5$ ............................................... G06F 15/62
[52] U.S. Cl. .................................. 395/127; 395/133; 395/138; 395/164
[58] Field of Search ............... 395/119, 120, 125, 127, 395/133–139, 141, 155–158, 160, 161, 164

[56] References Cited

U.S. PATENT DOCUMENTS

| | | | |
|---|---|---|---|
| 4,622,545 | 11/1986 | Atkinson | 358/183 X |
| 4,821,214 | 4/1989 | Sederberg | 395/120 |
| 4,873,652 | 10/1989 | Pilat et al. | 395/157 |

*Primary Examiner*—Heather R. Herndon
*Assistant Examiner*—Almis Jankus
*Attorney, Agent, or Firm*—Blakely, Sokoloff, Taylor & Zafman

[57] ABSTRACT

Graphical data are generated and manipulated for display on computer display devices. In the method of the present invention, all graphical images are maintained as a set of base geometries to which all geometrical operations will be applied. The encapsulation of the geometry is referred as a shape and shapes may be aggregated into objects called pictures. Geometrical operations will be performed at all times on the geometries in a local space, while further in the hierarchy the results of these operations will be rendered for whatever display device is being used in a hierarchical output method. Caches are maintained for geometry calculations such that regardless of the resolution of the output display, calculations need only be done once and geometric information is not lost as a result of bitmap processing.

15 Claims, 25 Drawing Sheets

Even-odd fill

Winding fill

Inverse even-odd fill

Inverse winding fill two filled shapes

A frame, B fill two framed shapes union

?

intersect difference

?

reverse difference

?
?

xor

?
?

METHOD AND APPARATUS FOR GENERATING AND MANIPULATING GRAPHICAL DATA FOR DISPLAY ON A COMPUTER OUTPUT DEVICE

BACKGROUND OF THE INVENTION

1. Field of the Invention

The present invention relates to an apparatus and method for displaying graphical images. More particularly, the present invention relates to a method and apparatus for generating and manipulating graphical information for output onto computer display devices.

2. Art Background

Computer display devices are essential for conveying information to computer users. The information displayed to the user can take many forms. For example, it may be useful to display information in terms of alphanumeric characters or in terms of graphical images. In either of these two forms, or a variety of other forms, the user seeks to maximize the quantity and quality of information displayed on the display, as well as maximizing the speed at which the information is displayed. The quantity and quality of information conveyed to the computer user is increased by the use of graphical representations or images on the output display. Human computer users tend to absorb and manipulate information more quickly when it is presented in a graphical form, rather than in alphanumeric form. The increased use of visual images thus creates a better environment for conveying information to the user. On the other hand, not all information lends itself to display in a graphical form. The optimal computer system needs to be able to manipulate both alphanumeric-type information and graphical information with relative ease.

It is also been determined in the computer industry that the use of color tends to increase the amount of information presented to the computer user. Both alphanumeric and other graphical information can be enhanced by the effective use of color. Thus, in addition to being able to process multiple types of information, for purposes of conveying large amounts of information, the ability to manipulate color and other attributes with that information is essential.

Unfortunately, the ability to display information in multiple formats with multiple colors and other attributes comes with the expense of processing time and memory usage. In conventional computer display systems, images are stored in a large block of memory allocated for the display screen. In this display screen memory, each memory bit is matched to a corresponding picture element (pixel) on the display system. Thus, images and/or text visible on the display screen is represented as either a one (black dot) or a zero (white dot) in the block of display screen memory. This type of image representation is known as a bitmap because each bit is mapped to one for one to a pixel on the display device. Although the use of bitmaps provides a simple method for image rendering on computer display systems, processing with bitmaps has some major drawbacks.

One major drawback is the volume of memory required to maintain a bitmap for a screen where each pixel has both a position data requirement as well as color other attribute data requirements. Thus, maintaining a one for one bitmap-to-pixel data structure is highly expensive in the context of memory requirements.

A number of methods of improving the memory efficiency of bitmap methods have been developed. See for example, "Method and Apparatus for Image Compression and Manipulation", U.S. Pat. No. 4,622,545, invented by William D. Atkinson, filed Sep. 30, 1982 and assigned to the assignee of the present invention. The Atkinson method improves over the conventional bitmap scheme by disclosing a method for defining display images in terms of inversion points. An inversion point is a point at which the state of all points having coordinates to the right and below the inversion point are inverted (e.g., binary zeros are converted to binary ones and vice versa). In Atkinson, all points comprising an image need not be stored in memory, only the information concerning inversion points. Thus, the Atkinson scheme represents both a savings in memory storage requirements as well as in processor execution time.

While the Atkinson does provide an improved scheme over the traditional bitmap method, bitmapping still suffers serious drawbacks when used for image manipulation. First, when the image is going to displayed on a device having greater resolution than the one for which the bitmap was created, it is necessary to either recalculate the entire image, or forego the increased resolution of the alternative output device. This is because a bitmap is a correspondence of one image point to one pixel point on the first device and where more pixels are available, additional data is required.

The more serious drawback of maintaining all image information as a bitmap is that once an image is reduced to a bitmap, the bulk of the geometrical information about the image is lost. Operations on the image become very complicated and frequently require complete recalculation of the preceding data that led to the image. For example, when an image is constituted by the sum of two geometrical shapes and that summed image is rendered as a bitmap, performing another geometrical operation to the aggregate results in inexactness because geometrical information about the constituent elements is discarded when the bitmap image is developed. The problem is exacerbated when the image includes a lot of color and other attributes which must then be recalculated for each bitmap rendition.

The present invention provides a method of treating all display information as a geometrical form where the forms can be manipulated and processed irrespective of the type of output device that will be used and without discarding useful information once an image is rendered for a particular output display. Additionally, the present invention provides for an efficient hierarchical approach to geometry manipulation and rendering which allows the use of prior methods, such as the traditional bitmap scheme or the improved Atkinson scheme in order to maintain compatibility with prior systems.

SUMMARY OF THE INVENTION

The present invention provides a method and a means for generating and manipulating graphical images which are to be displayed on computer output devices. In the method of the present invention, all graphical images are maintained as set of base geometries to which all geometrical operations will be applied. The encapsulation of a geometry is referred to as a shape and shapes may be aggregated into objects called pictures. Geometrical operations will be performed at all times on the geometries, while further in the hierarchy the results of these operations will be rendered for whatever display device is being used. Caches are maintained for shapes and their attributes such that regardless of the resolution of the output display, calculations need only be done once and geometric information is not lost as a result of rendering.

All operations are performed in a local geometry space which provides for rapid geometry manipulation. Renderings to hierarchically arranged output spaces are determined by transformations to the particular hierarchy level. Thus, there is provided the marriage of rendering and geometry operations to provide for very fast and efficient use of computer resources by defining all information to be displayed in the form of base geometries which are easily manipulable.

The present invention provides a method and means for overcoming the failure of prior graphic systems for being able to properly generate and manipulate graphical data for display on any resolution output device without having to redefine and recalculate the underlying geometries based on the output resolution.

NOTATION AND NOMENCLATURE

Figure 1:
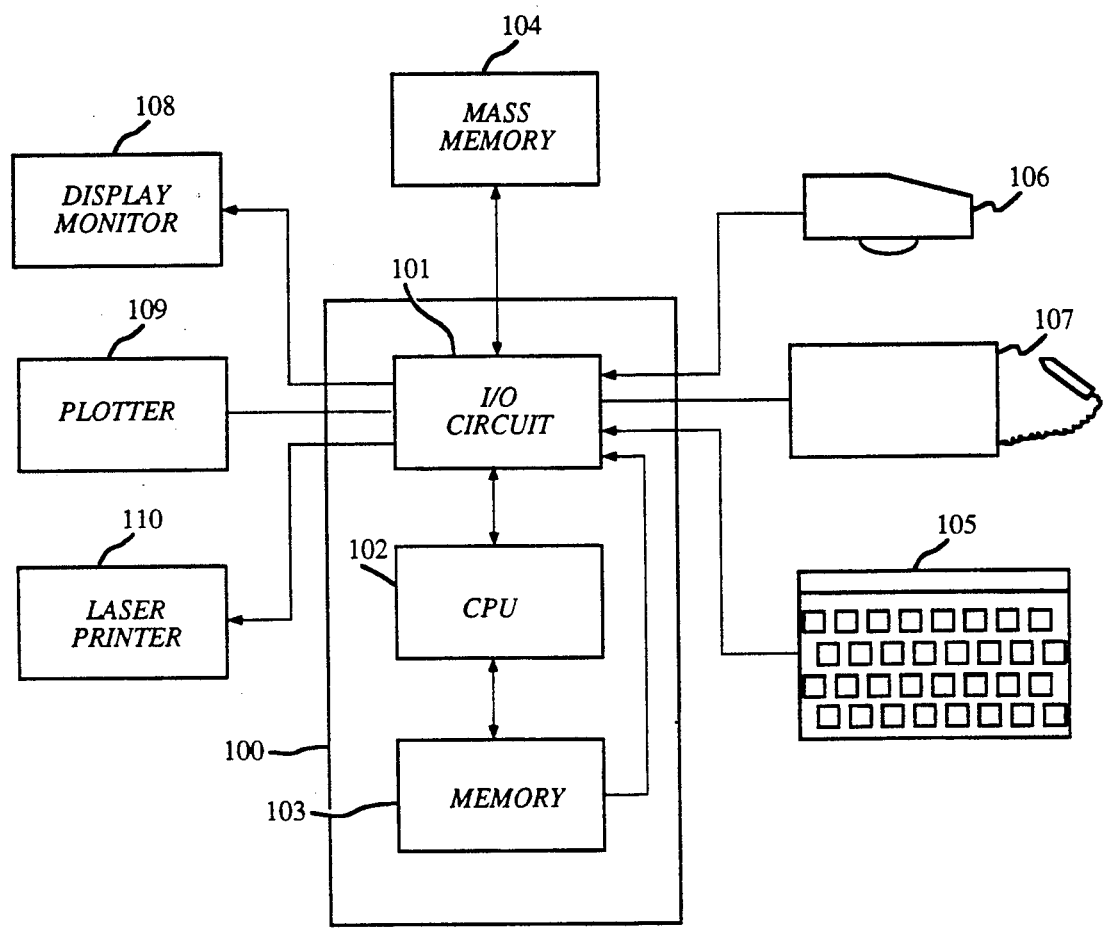
FIG. 1 illustrates a general purpose digital computer incorporating the present invention.

The detailed descriptions which follow are presented largely in terms of algorithms and symbolic representations of operations on data bits within a computer memory. These algorithmic descriptions and representations are the means used by those skilled in the art in the data processing arts to most effectively convey the substance of their work to others skilled in the art.

An algorithm is here, and generally, conceived to be a self-consistent sequence of steps leading to a desired result. The steps are those requiring physical manipulation of physical quantities. Usually, though not necessarily, these quantities take the form of electrical or magnetic signals capable of being stored, transferred, combined, compared and otherwise manipulated. It proves convenient at times, principally for reasons of common usage, to refer of these signals as bits, values, elements, symbols, characters, terms, numbers or the like. It should be borne in mind, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operations described herein which form part of the present invention; the operations are machine operations. Useful machines for performing the operations of the present invention include general purpose digital computers or other similar devices. In all cases, there should be borne in mind the distinction between the method operations in operating a computer and the method of computation itself. The present invention relates to method steps for operating a computer and processing electrical or other physical signals to generate other desired physical signals.

The present invention also relates to an apparatus for performing these operations. This apparatus may be specially constructive for the required purposes or may comprise a general purpose computer as selectively activated or reconfigured by a computer program stored in the computer. The algorithms presented herein are not inherently related to any particular computer or other apparatus. In particular, various general purpose machines may be used with programs written in accordance with the teachings herein or may prove more convenient to construct more specialized apparatus to perform the required method steps. The required structure for a variety of these machines will appear from the description given below.

DETAILED DESCRIPTION OF THE INVENTION

A method and apparatus for generating and manipulating graphical images for display on computer output devices is described. In the following detailed description, numerous specific details are set forth such as specific computer components, etc., in order to provide a thorough understanding of the present invention. It will be apparent, however, to one skilled in the art that the present invention may be practiced without these specific details. In other instances, well-known components, structures and techniques have not been shown in detail to avoid unnecessarily obscuring the present invention.

Overview of the Computer System of the Present Invention

Referring first to FIG. 1, a typical computer-based system for generating computer graphic images according to the present invention is shown. As shown, there is a computer 100 which comprises three major components. The first of these is the input/output (I/O) circuit 101 which is used to communicate information in appropriately structured form to and from the other parts of the computer 100. Also shown as part of the computer 100 is the central processing unit (CPU) 102 and memory 103. These two latter elements are those typically found in most general purpose computers and almost all special purpose computers. In fact, the several elements contained within computer 100 are intended to be representative of this broad category of data processors. Particular examples of suitable data processors to fill the role of computer 100 include machines manufactured by Apple Computer Co., Cupertino, Calif. Other computers having like capabilities may of course be adapted in a straightforward manner to perform the several functions described below.

Also shown in FIG. 1 is an input device 105, shown in a typical embodiment as a keyboard. Also shown as input device is a graphics tablet 107. It should be understood, however, that the input device may actually be any other well-known input device (including, of course, another computer). A mass memory device 104 is coupled to I/O circuit 101 and provides additional storage capabilities for the computer 100. The mass memory may include other programs, fonts for different characters and the like and may take the form of magnetic or optical disk drive or any other well-known device. It will be appreciated that the data retained within mass memory 104, may, in appropriate cases, be incorporated in standard fashion into computer 100 as part of memory 103.

In addition, three (3) typical computer display devices are illustrated, the display monitor 108, the plotter 109, and a laser printer 110. Each can be used to display images generated by the present, though each has or may have different resolutions. A cursor control 106 is used to select command modes and edit graphics data, such as for example, a particular image, and provide a more convenient means to input information into the system.

Operation of the Present Invention

In the present invention a hierarchical geometric approach is taken for the generating and manipulating of graphical information. At the lowest level, all displayable information is described by a single geometric object or an aggregate of geometric objects. Displayable information includes both conventional graphic information as well as alphanumeric data. Geometries are defined in a local space, and once defined, are operated on in that local space. Geometries in local space are encapsulated in graphical objects called shapes. A shape has two associated cache lists, the first being a geometry cache which maintains lists of calculations about the shape; the second cache list maintained for the shape is for parameters required for drawing the shape. Other caches are maintained for information pertaining to color, transformations, clipping and patterns. A single shape may be drawn multiple times on multiple output devices and thus separate caches are maintained for each drawn instance.

Because a shape is an encapsulated geometry, geometric operations work on shapes regardless of the shape type, shape fill, or shape content. Shape objects allow one geometry to be transparently converted into another geometry, the caches maintaining the information calculated from the geometry. The shape object data structure allows the actual geometry to be located remotely, such as on a graphic accelerator or stored on a disk.

Where a shape is an encapsulated geometry, a collection of shapes is referred to as a picture. Pictures can impose a hierarchy on shapes, override characteristics of constituent shapes, include other pictures or reference a given shape one or more times. However, despite the level of complexity that may be embodied in a given picture, as its lowest level a picture is a hierarchy of geometries and therefore, the basic geometrical operations and caching descriptions are applicable to pictures as easily as shapes. Most of the following discussion will be directed toward shapes, however, the operations and data discussions apply equally to pictures.

Figure 2:
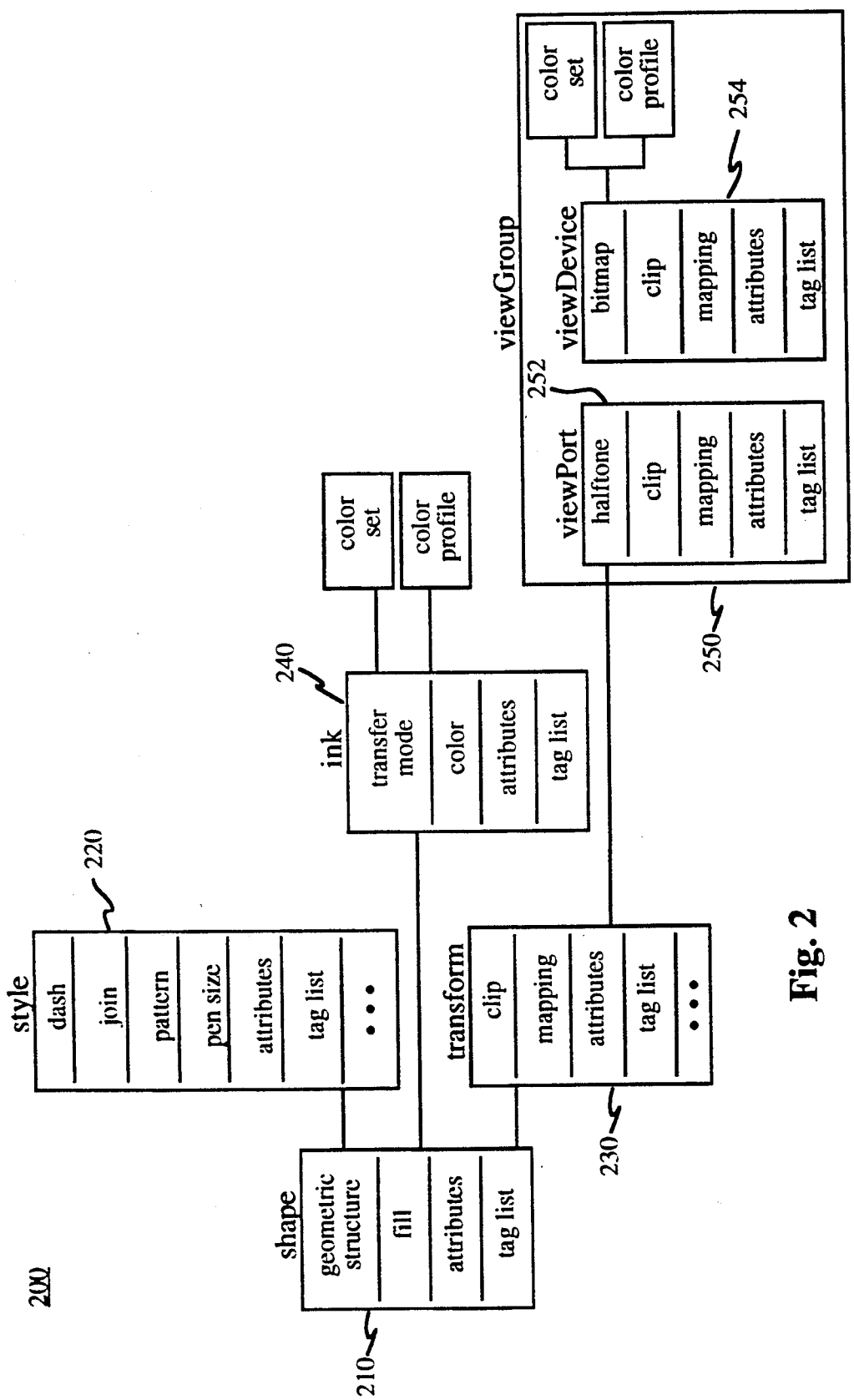
FIG. 2 illustrates a data structure showing the object data arrangement for geometric shape definitions.

FIG. 2 shows the image defining data structure 200 of the present invention. The shape object data 210 maintains information about the geometric structure as well as other attributes for the shape in a collection of caches. The other attributes might include whether the geometry should be stored in an accelerator memory, if there is one, whether direct access to the shape's contents is allowed, and whether to direct transformation operations to affect the shape's transform or its geometry, etc. As described, a shape has several associated graphics objects. Particularly, style object data 220 and transform object data 230 are maintained for each shape. The contents of style object data 220 will be discussed in much detail more fully herein. The transform object data 230 includes the mapping required to transform the shape's geometry into device coordinates from local space as well as defining the region that describes the clip that affects drawing to the device. Separate transform data is maintained per drawn instance, and each can be shared by all shapes that reference the same transform. Ink object data 240 is also defined to accommodate color information.

Defining style and transform (and ink) object data allows the sharing of common qualities among more than one geometry, such as color, dashing, rotation and clipping, etc. Also provided is a compact way to describe repetitive geometries, such as dashing and patterns. These will all be more fully described herein as will the hierarchical rendering approach for translation from local geometry space to global viewport/window space and to the ultimate rendering of graphical images in a device space as defined by the view group data structure 250 which maintains pointers to the actual output pixels to be drawn.

Figure 3A:
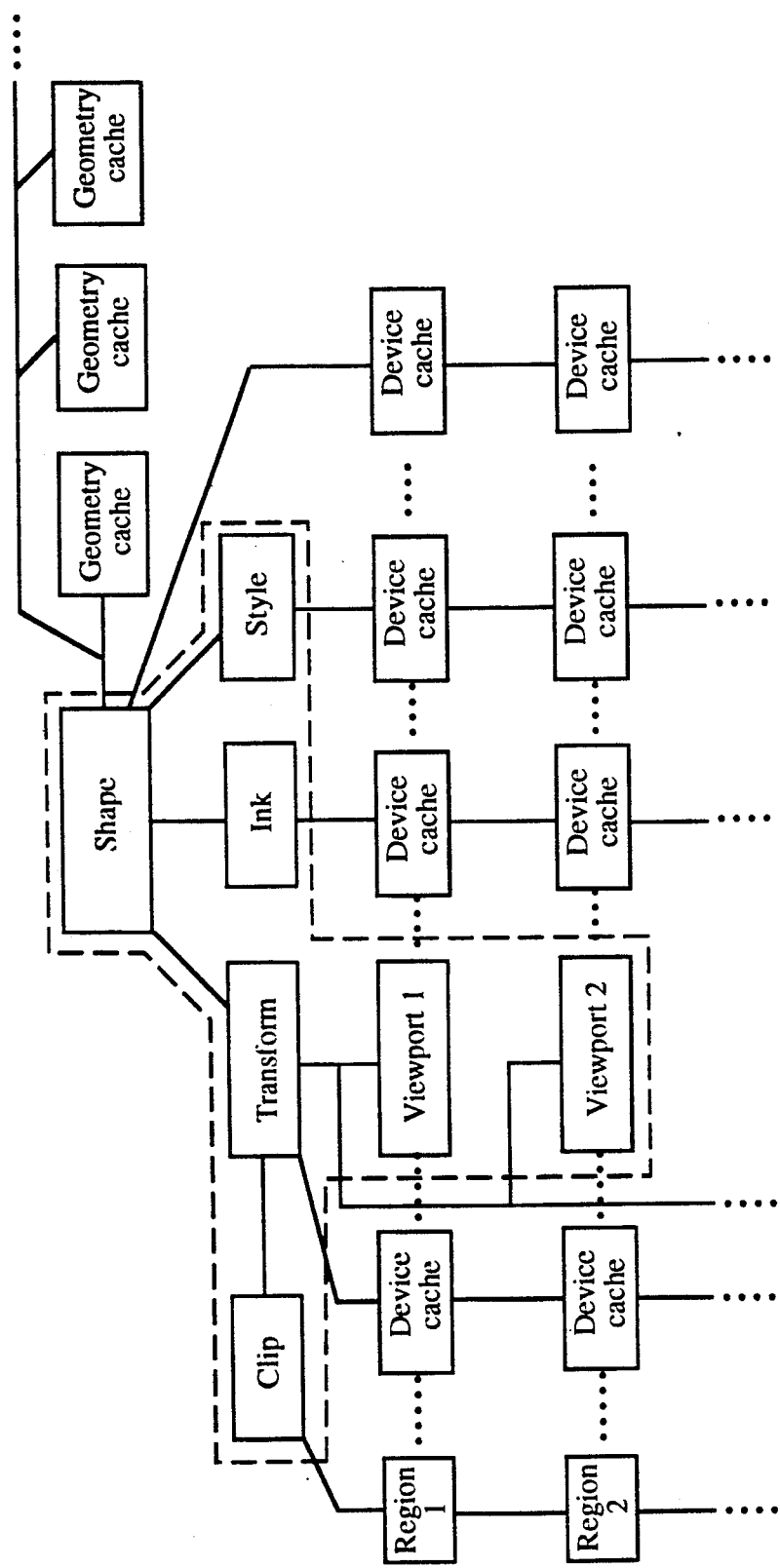
FIGS. 3(a)-3(b) illustrate the relationship between the internally maintained caches and the data structure of FIG. 2.

FIG. 3(a) shows the relationship between the image defining data shown in FIG. 2 and the internally generated and maintained caches. The figure shows the two cache lists associated with a shape, the geometry caches for maintaining the shapes geometry calculations and the device caches for maintaining information related to drawing the shape in device space. Also shown in FIG. 3(a) are drawing caches for transforms, transforms' clips, inks and styles. Additional graphics objects not shown have caches for geometry and/or drawing, including: viewports, view devices, color sets, color profiles, pictures, fonts and mathematical operations.

Figure 3B:
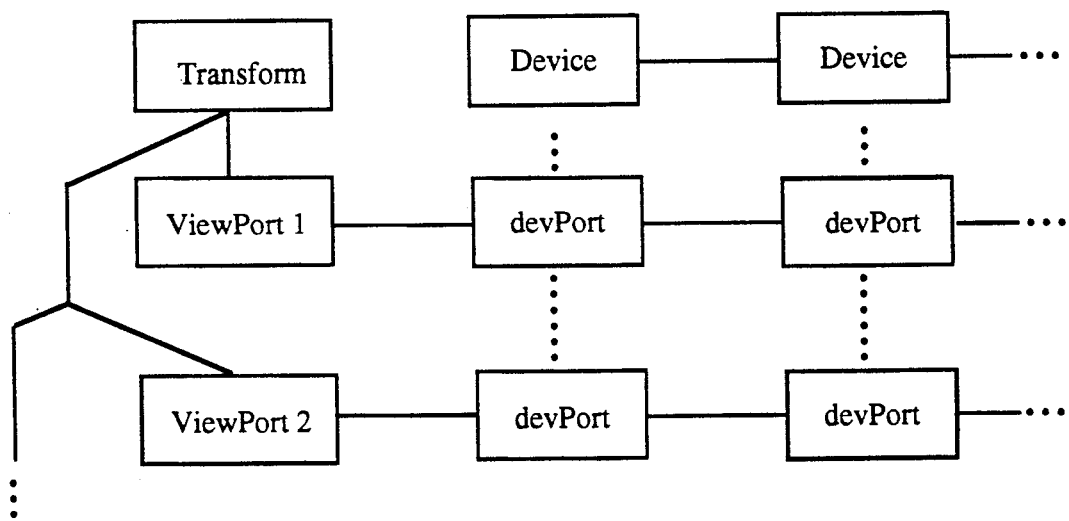

As described above, a viewport may cover more than one view device. FIG. 3(b) shows how FIG. 3(a) is expanded in order to accommodate this capability. Where in FIG. 3(a) each viewport was drawn to a single view device, FIG. 3(b) shows that portions of each viewport may be drawn to various device ports, each associated with a different view device. Note that the caches shown and discussed with respect to FIGS. 3(a) and 3(b) need only be built when they are required, and not necessarily defined initially.

Referring back to FIG. 2, it can be seen that the geometric structure of the shape is the underlying basis to the overall geometry/rendering system. The world, in local space can be reduced to a few basic geometric structures which will be described with respect to FIGS. 4(a)–4(g). All geometry is specified in terms of one or more x-y coordinate pairs, or points. For instance, a line has two points that define the line segment, and a rectangle has two points that define opposing corners of the rectangle. Points define the geometry relative to the other points within the geometric structure.

Points, lines and rectangles are geometric structures, described by fixed-point coordinates. Additionally, geometric structures are defined for curves, polygons, paths, and bitmaps. These structures say nothing of the position, resolution, color, fill or clipping associated with the structure. The geometric structure alone does not define how the geometric structure is drawn, but provides a model upon which operations will be carried out.

Figure 4A:
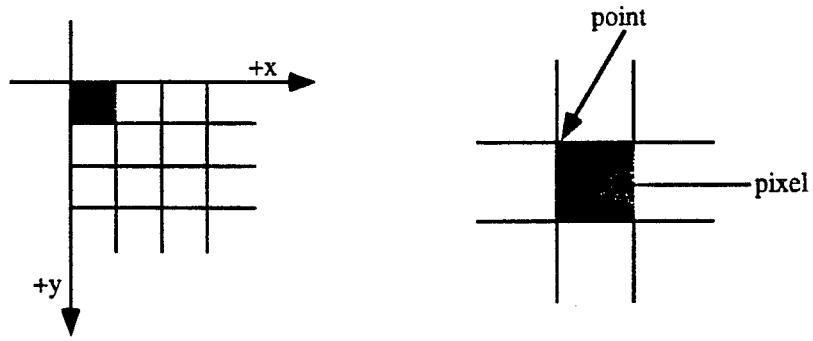
FIGS. 4(a)-4(g) illustrate the basic geometries for all shapes as may be defined in accordance with the present invention.

Referring now to FIG. 4(a), the first, and basic geometric structure, the point, is shown. Points are defined by two fixed-point integers. The value of (0,0) specifies the coordinate origin. The coordinate axes are upside down from the traditional Cartesian system: X values increase to the right, Y values increase going down. Thus, local coordinates mapped unaltered into device coordinates cause (0,0) to correspond to the upper left corner of the device defined in device space. In device coordinates, a pixel is surrounded by grid lines; the point is located on the upper left boundary of a pixel as shown in FIG. 4(a). The styles associated with the shape to be described herein determine how a point is drawn when rendered in device space.

Figure 4B:
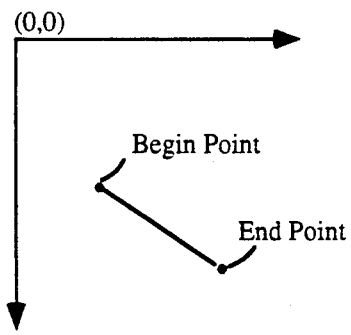

FIG. 4(b) shows the next geometric structure, the line. A line is defined by specifying two points, the beginning point and ending point of the line. When rendered, lines are drawn framed, that is, drawn using the associated style's pen size, dash and pattern. Also, start and end caps may be specified as will be described further. Lines are drawn with a fill type that defines the frame as starting at a first point and ending at the end point; although the frame is not closed because a line never encloses an area.

Figure 4C:
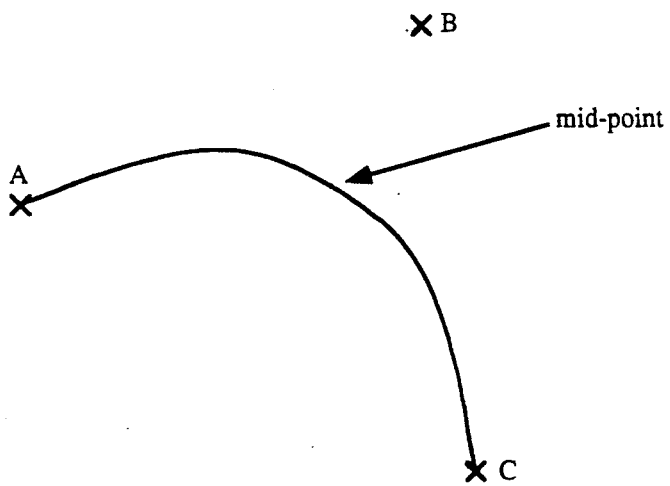

The next geometric structure for defining shapes is the curve, shown in FIG. 4(c). Curves are defined by three points: a first, last and control. The curve described by these three points is a quadratic Bézier. A line connecting the first point and the control point describes the initial direction, or tangent of the curve. The line connecting the control point and the last point describes the final tangent. The curve is contained by the triangle formed by the three points. The mid-point of the curve is half-way between the control point and the mid-point of the start and end points. Curves, like lines are framed when drawn, and can have start and end caps, dashes and patterns, but not joins which are described further herein. Curves may be filled in the same way as lines.

Figure 4D:
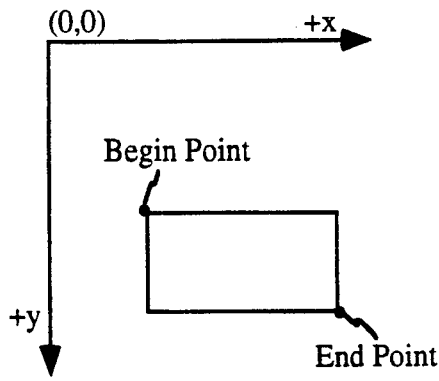

FIG. 4(d) shows a rectangle as the fourth basic geometrical structure. Rectangles are defined by two points that define opposing corners of a rectangle. By convention, these two points are the upper left and lower right corners, however either diagonally opposing pair may be chosen. It is also only by convention that the upper left corner is treated as a first point for a rectangle. Rectangles may be filled or framed when drawn with the first point specifying both the beginning and end of the frame. Rectangles have no start or end as far line caps are concerned, and have a join at each corner.

Figure 4E:
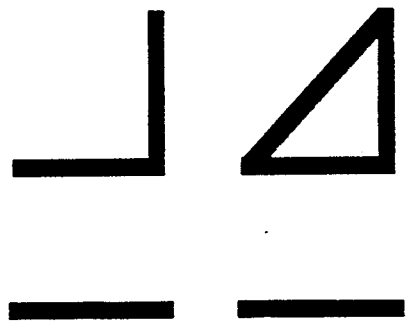

FIG. 4(e) shows a basic form of a polygon. The polygon data structure defines a single contour, or series of connected points. A polygon describes the number of points and the points themselves, but does not describe the lines connecting those points. Specifically, it does not define whether the last point is connected to the first point. The fill operations determine whether a polygon is described as an open or closed frame. The polygon data structure allows more than one contour to be specified, each contour describing zero or more points. The contour count, point count and points for each contour are referenced sequentially to define the entire polygon structure.

Figure 4F:
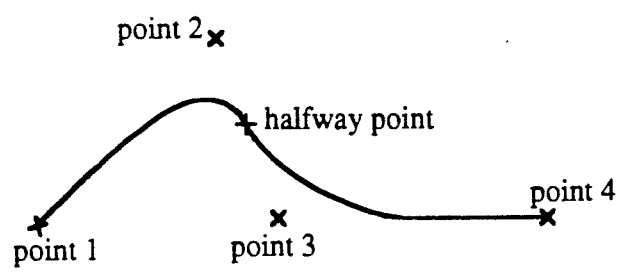

Contours can have curved segments; when they do, they referred to as paths. A path is shown in FIG. 4(f). A path is identical to a polygon, except it has an array of bits that specify when a vector point is on the path or off the path. Two consecutive points on a path form a straight line. A point off the path causes the path to diverge toward that point, and then back to the next point on the path, in a smooth, continuous curve, identical to the quadratic Bézier defined above. Like polygons, paths may have more than one contour, each having zero or more points. Each contour defines a start and end; each on-the-curve point defines a join. Polygons and paths are dashed in the order of points in the contours. Polygons may be used to describe a large number of lines or connected line segments; all of the straight lines in CAD or architectural drawing could be combined into a single polygon structure.

Figure 4G:
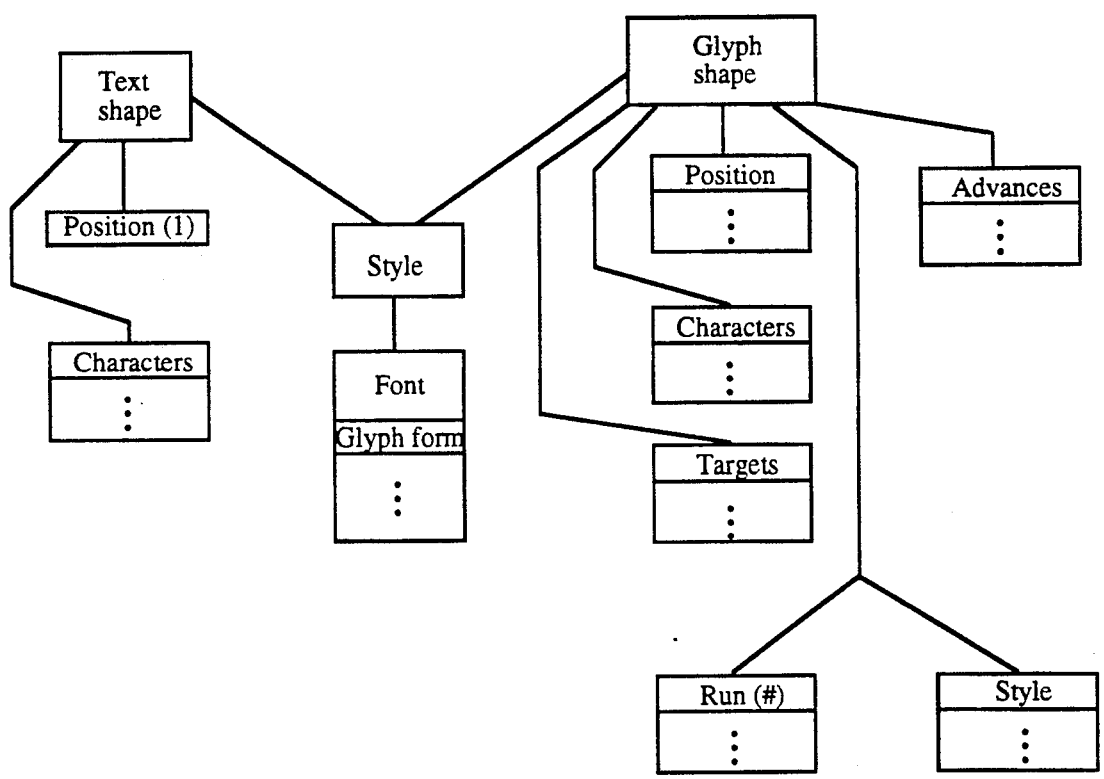

Text and glyphs are the next geometry type. A glyph is composed of one or more paths that represents a letter or symbol in an alphabet or language, or part of that letter or symbol. FIG. 4(g) shows the data organization for text and glyph shapes. Text shapes and glyph shapes are similar, but a glyph shape has one position per character instead of one for the entire text shape. Glyph shapes can have additional arrays specified including: advances, which specify the position to be absolute or relative; tangents, which specify the direction and scaling of the glyph; and runs and styles, which associate one or more consecutive characters with a style possibly other than the glyph shape's style, and therefore with a different font. Glyphs allow the varying of the position and style of each character in a text line. Each glyph can have its own position. Text and glyph shapes are not affected by joins, start or end caps, dashing or patterns. Text is most useful for non-formatted character drawing or glyphs can be used for all text drawings; a single glyph shape can describe all of the characters on an entire page. Text may be converted into glyphs and vice versa without any loss of information. As with all geometric structures, glyph shapes (and text, once converted into a glyph in the present embodiment) can be used for drawing, clipping, dashing, patterns, joins, start or end caps. The preceding will be described more fully herein. Co-pending patent application Ser. No. 07/881,789, entitled "An Apparatus and Method for Textual Line Layouts", invented by David Opstad and Eric Mader, assigned to the assignee of the present invention and filed concurrently herewith, discloses a novel method of line-layout processing using the above-described text and glyph features.

The final geometrical structure is the bitmap. A bitmap points to a block of memory that contains a bit image. Bitmaps have a dual nature, as both something to draw with and something to draw to. Bitmaps may be associated with both shapes and devices and the same bitmap may be shared by both. This is desirable for implementing double buffered drawing. Bitmaps may describe patterns but may not be patterned. Bitmaps may be drawn through arbitrary transforms and may be clipped by any other geometry, including another bitmap. Bitmaps may be transformed, either with a geometric operation, which produces a new bitmap or with a drawing operation, which causes the bitmap to be displayed through a transformation.

All of the above geometry structures, those displayed in 4(a) to 4(g) as well as bitmaps are all, at their lowest level, a geometry and may be operated on by standard geometrical operations in the local space. Two other useful geometries to define are emptyType and fullType. FullType defines all the points in the local space which provides and easy way to specify inverse images. Conversely, emptyType specifies no points in the local space which provides a convenient test for comparing for when a shape no longer has any defined points.

Figure 5:
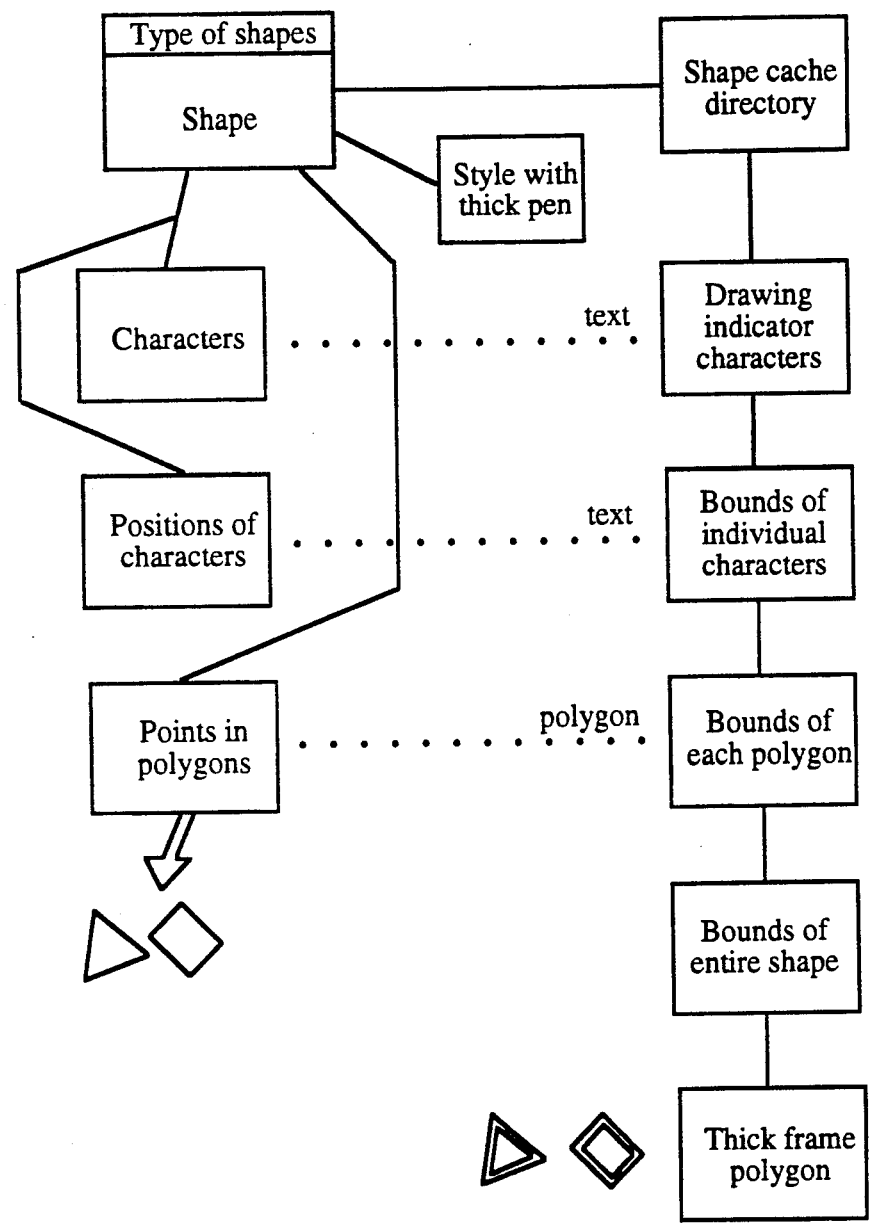
FIG. 5 is an example of the types of data kept in a shape's geometry cache.

As described above, one of the caches maintained for a shape is its geometry cache. FIG. 5 shows a few of the types of data that can be maintained in a shape's geometry cache. It is apparent that the data calculated varies with the type of geometry contained by the shape.

Figure 6:
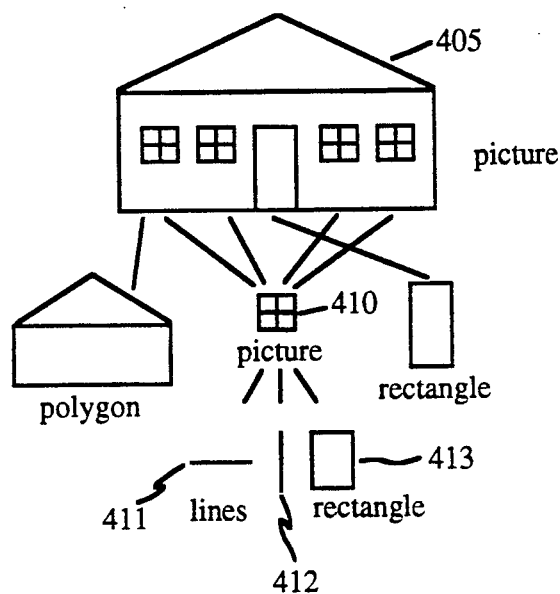
FIG. 6 illustrates a few basic shapes formed into a picture as a hierarchy of shapes.

Referring back now to FIG. 2, it can be understood that by representing shapes as a geometric structure in local space that shapes are device-independent. Likewise, shapes are unlimited in size and may be disk-based. Pictures, like all shapes can be edited and parsed. Pictures are lists of entries, where any entry may be a shape, including another picture. Pictures may be created from an array of shapes, or by creating an empty picture and then adding shapes one or more at a time. Pictures can describe a hierarchy of shapes as shown in FIG. 6. In the example in FIG. 6, the picture 410 composed of shapes 411, 412 and 413 was created once and added to the house picture 405 four times. A shape or other pictures can be added to a picture any number of times, but a picture can never contain itself.

Each shape, style, ink and transform has an associated attribute called an owner count. When a shape is created or added to a picture, its owner count is increased. When a picture is disposed of, the owner counts of its constituents shapes are decreased. An application that disposes of everything it creates never needs to worry owner counts; when the last shape referencing the object is disposed, the object itself will be disposed.

In the hierarchy of shapes, shapes are drawn using the concatenation of their transform with the picture's transform, concatenated with the picture above it, and so on. The clip shapes of the transforms are intersected at each level so that the drawing of each deeper level is contained within the previous clip.

Figure 7:
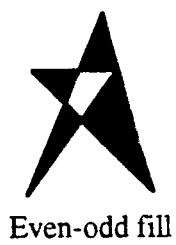
FIG. 7 illustrates examples of filling characteristics which may be defined in accordance with the present invention.
Figure 7:
Figure 7:
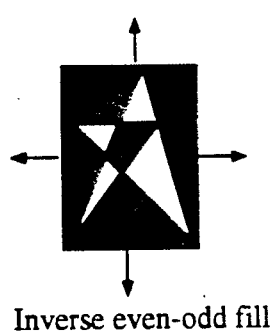
Figure 7:
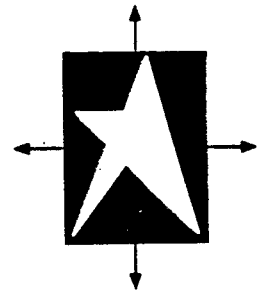

A number of the above geometry descriptions made reference to filling characteristics. The shape object data 210 also references data for a shape's fill parameters. The shape's fill defines how the geometry is interpreted. A shape may be defined as having no fill in which case the geometry is not interpreted at all; no shape will be drawn. This is useful for hiding shapes. Other fills include an open-frame fill which specifies that the geometry is treated as a set of connected lines or curves, and a closed-frame fill which supplements the open-frame fill by specifying that the last point of a contour is connected to its first. The previous two fills are illustrated in the polygon example shown in FIG. 4(e). The traditional even-odd rule and winding-number-rule fills are also available. Finally, because of the geometry nature of shapes, an inverse fill is easy to specify. An inverse fill defines all the area not included in the shape. This provides an easy way to clip so that drawing is not allowed over a shape. An example of the even-odd fill and winding fill as well as the associated corollary inverse fills are shown in FIG. 7.

Referring back to FIG. 2, the structure for defining style object data 220 will be described. A style modifies the geometry of a shape when the shape is drawn. For framed shapes, styles describe pen thickness, dashing, joins, start caps and end caps. For framed and filled shapes, styles describe patterns and the degree of approximation allowed for geometric operations when one shape is converted into another. For text-type shapes, styles describe the text point size, font, face, platform, variation, justification and orientation. Styles also contain attributes that affect the way shapes are grid fit, dashing variations, etc. Attributes are a collection of bits that allow turning features on and off in a graphics object. There are different attributes to be defined depending on whether the definition is for shapes, styles, inks, viewports, etc. Graphics objects also have a collection of fields that provide values and references to other graphics objects. For instance, the clip in a transform is specified by reference to a shape; a dash in a style is specified by a dash record which contains dash attributes, a reference to a dash shape, and the scalar values such as the dash advance, phase, and scale, described below.

One of the style characteristics defined for the style object data 220 is the pen size. Pen size is one-dimensional, it specifies the thickness of the line or curve drawn. The pen may be on the inside, center or outside of the shape. The pen is specified by a fixed-point number wherein a size of zero causes hairlines to be drawn instead of thick lines. A hairline is always centered on the geometry and is one pixel wide.

Figure 8A:
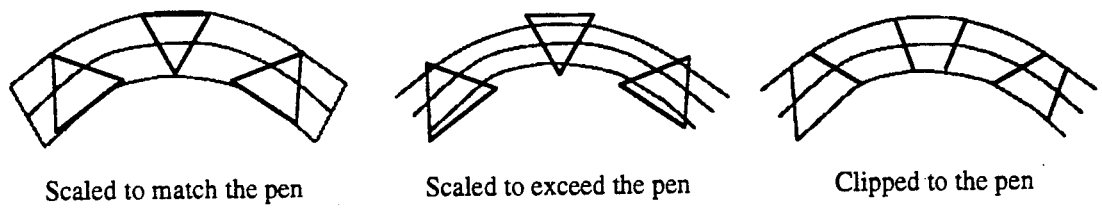
FIGS. 8(a)-8(f) illustrate style attributes associated with a given shape in accordance with the present invention.
Figure 8B:
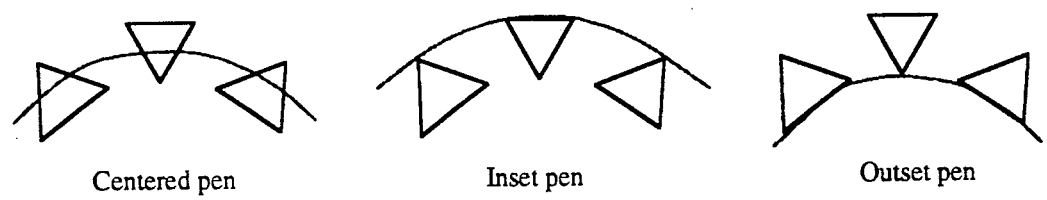

The next style characteristic defined by the style object data 220 is the dashing for the rendered image. A dash is defined by four attributes: a shape, the advance, phase and scale. The dash shape specifies the geometry to be drawn along the frame of the shape to be dashed. This geometry is as described with respect to any of the geometries described above. Therefore, any shape including text, bitmaps and polygons may serve for dashing the frame of another shape. The advance is the distance moved down the path of the frame before a succeeding dash is added. One way to do this is to specify an auto-advance attribute which adjusts the distance so that a whole multiple of dash shapes fit each contour. The phase specifies the initial placement of the dash which can vary from zero specifying no initial offset, to nearly one specifying an initial offset just short of the dash advance. The scale specifies the vertical scaling of the shape, independent of the pen thickness. The dash may be clipped to the pen thickness by specifying a clip dash attribute. FIG. 8(a) shows various scalings of a dash wherein the dash is a triangle shape and the contour is a curve. The dash can be inset, centered or outset, the same as the pen is, as shown in FIG. 8(b).

Figure 8C:
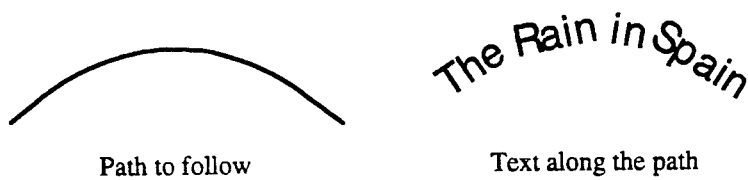

Dashing may also be used to cause shapes to follow a given path. A text geometry can be specified as the dashing shape and then by specifying a curved path, that is dashed, the text is drawn along the path as shown in FIG. 8(c). Thus, by using geometries to represent a shape that is dashed as well as using geometries to represent a dash, a versatile tool for output control is possible.

The next style type that is defined for the style object data 220 are start caps, end caps and joins. The drawings at the start and end of a line or a curve are start and end caps, respectively; these shapes cap the line. The drawings rendered at corners are joins; these shapes join two line or curve segments. Start caps are drawn for points, lines and curves and for open polygons and paths. End caps are drawn for all of the same except for points. Joins are drawn for points between the first and last point in polygons and paths. Joins are only drawn for path points which are on the curve.

Figure 8D:
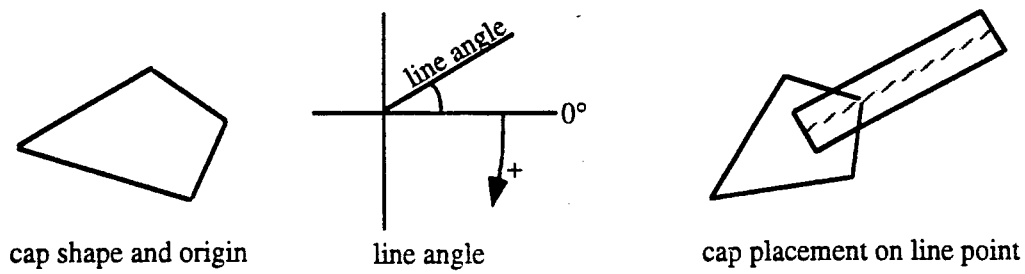

Caps are rotated to match the tangent at the start or end of a segment. They are placed so that the (0,0) point of the cap matches the align point. This is shown in FIG. 8(d). Similarly, joins are rotated to match the mid-angle of the two intersecting segments.

Again, where previous systems used a single symbol to represent caps and joins, in the present invention, caps and joins are any defined geometry. Therefore, any shape or picture can be used as a cap or join, just scaled in most cases to the pen size.

Figure 8E:
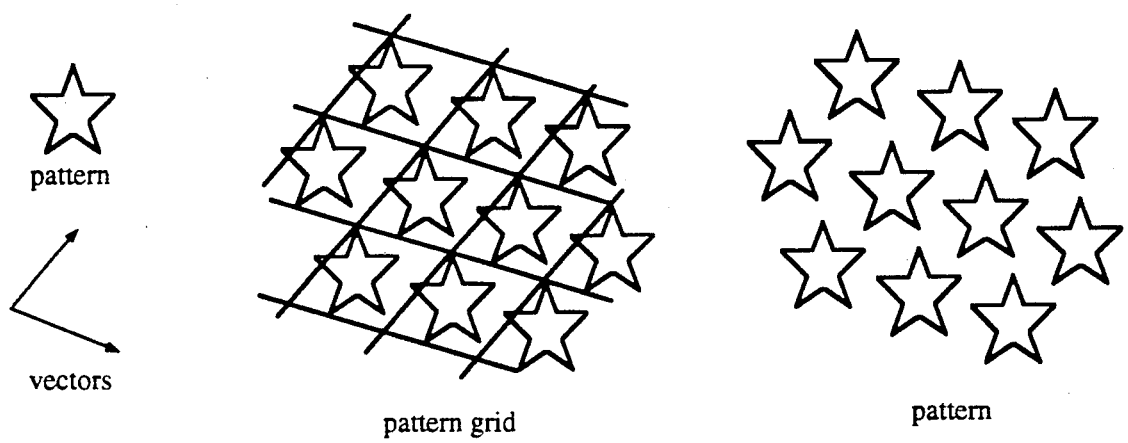

The next type of data defined by the style object data 220 are patterns. A pattern is described by a shape and a pair of vectors that describe how the shape is placed. The vectors define a pattern grid, which is formed by repeating a new set of vectors at the vectors' end points. The vectors can be thought of as describing a grid of parallelograms, where the pattern is drawn at every intersection. An example of a pattern being formed is shown in FIG. 8(e). Again, patterns may be made of any encapsulated geometry thereby providing a versatile patterning tool.

Figure 8F:
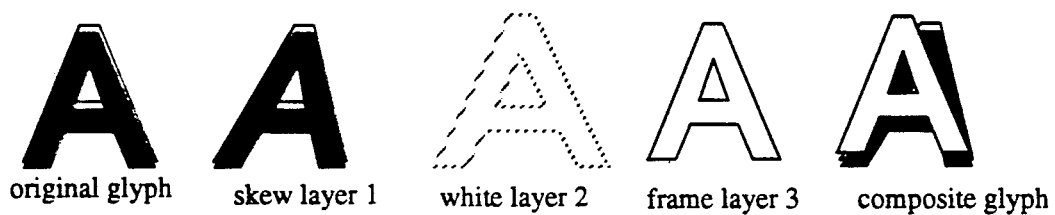

Style data affecting text and glyph shapes require special attributes to be defined. These include the font, face and size for describing their basic geometry and are required when converting the shape to another type or for other shape operations. The text size is specified by a fixed-point number and a font is specified by a font reference returned by the font routines. A face is described by one or more layers, each layer creating a black part or a white part of the shape. The composite face is created by adding and subtracting layers in the order that they are defined. For example, a shadow face may be composited from a black fill layer, a white fill layer and a black frame layer. FIG. 8(f) shows a composite character which is described only by the black portions of the character and all the white parts are transparent. Further, the composite glyph can be converted into a path which can be used in the same manner as any shape can be used.

In addition to the above-described style attributes, those skilled in the art will envision numerous alternative styling data to be maintained in a cache list to be associated with the geometric structure and shapes as defined above.

Figure 9A:
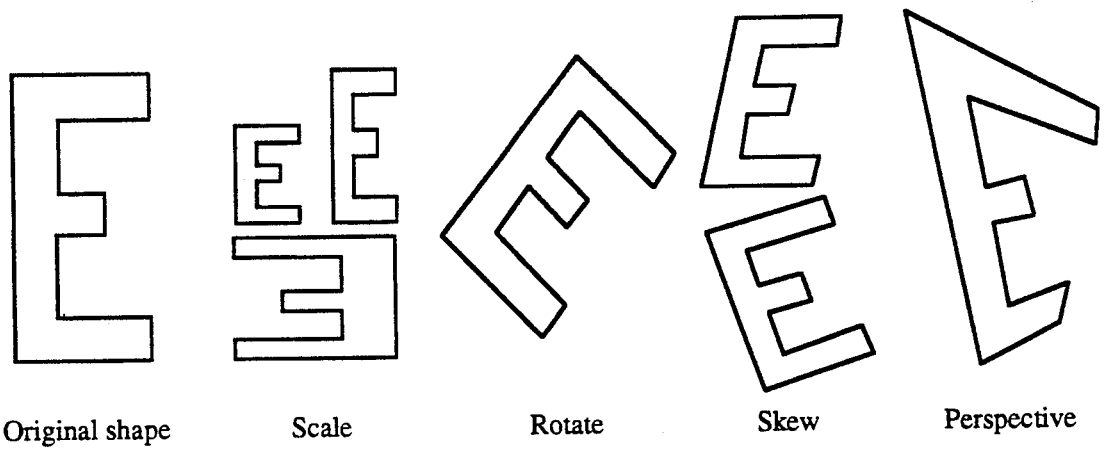
FIGS. 9(a)-9(c) illustrate a defined shape undergoing transformations including mapping and clipping in accordance with the present invention.

Referring back now to FIG. 2, a transform object data arrangement 230 associated with a shape definition 210 will be described. A transform is a description of the clipping and matrix mapping to be applied to a shape when it is drawn. A transform additionally contains hit testing parameters, and a list of viewports which will be described in following paragraphs. Transforms use a three-by-three mapping matrix that allow translation, scaling, skewing, rotation, perspective or any in combination. Note that scaling also allows mirroring; all shapes drawn, including bitmaps, can be distorted to be upside down, right to left, or both. This is accomplished by passing a negative for scale factors. FIG. 9(a) shows a character after being translated in a number of different ways. Those skilled in the art will be aware of numerous matrix approaches for graphical transformations.

Figure 9B:
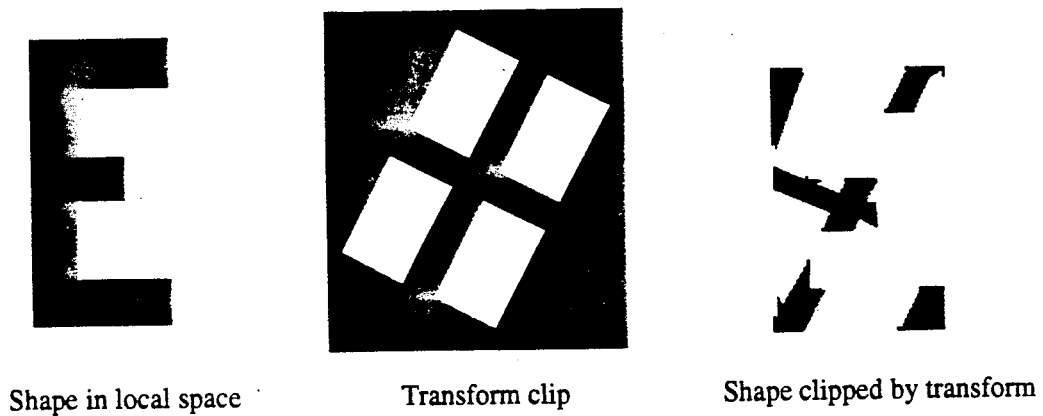
Figure 9C:
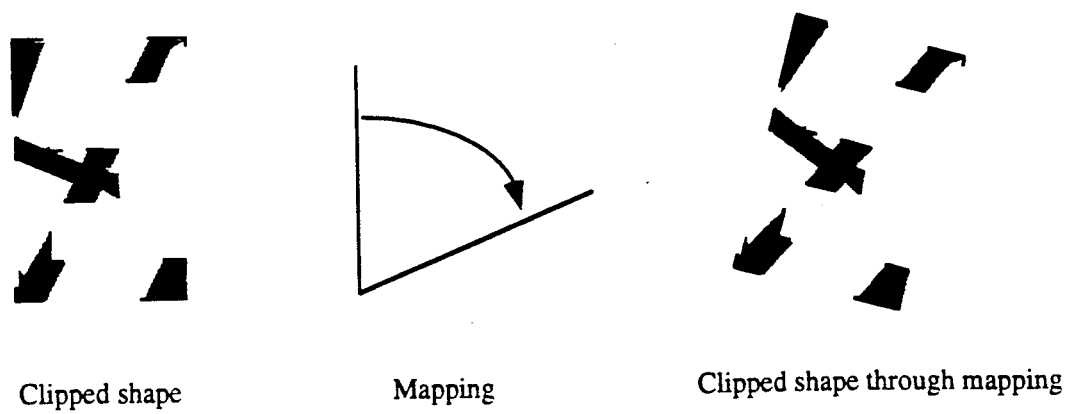
Figure 10:
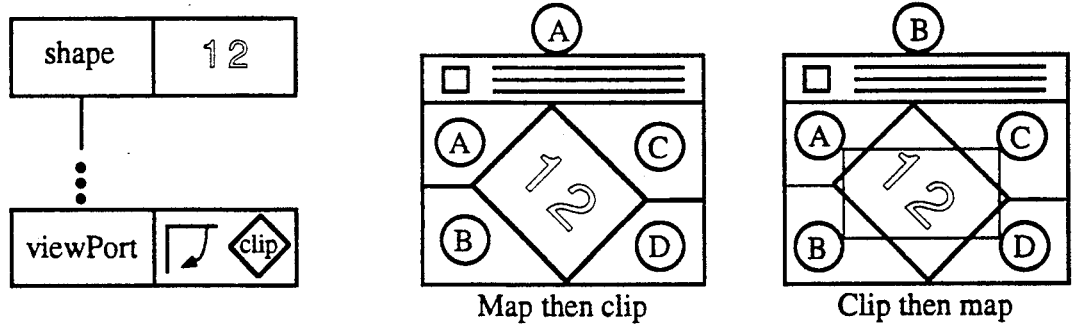
FIG. 10 illustrates the effect of changing the order of clipping and mapping operations at certain hierarchy levels.

The transform object data 230 also defines the clip data which can be described by a reference to any shape geometry and fill type. Shapes, style geometries and a transform's clip are specified in local space. The transform and viewport's mapping specify going from local space to global space. FIG. 9(b) shows a specified clip applied to a shape and FIG. 9(c) shows that clipped shape processed through a mapping. From the representation in local space of the mapped, clipped shape, the next step would be to map to a viewport and then clipping by the viewport clip. It is usually desirable to map first then to clip because to clip the unmapped shape may obscure portions outside the mapped/clipped boundary as is illustrated by example B of FIG. 10. Finally, from there the shape is mapped by the view device mapping then clipped by the view device clip. The shape is mapped into coordinates where one unit maps to one pixel.

The display spaces from viewports to view devices will be described with respect to their data structure in succeeding paragraphs. The selection of viewports to receive the shape once mapped is directed by the transform's viewport list. For each viewport in the list, the shape is drawn once. Multiple viewports allow the shape to appear in more than one window view at once. For instance, two viewports allow a window to have an editing view and a full-page view. Or, two viewports can be used to update both the window and an off-screen bitmap at the same time. Each entry in the viewport list corresponds to one or more view devices. If a viewport crosses multiple view devices, then one entry in the viewport list will cause drawing to occur once per intersecting view device.

The transform object data 230 also defines information with respect to specifying the range of results returned by hit testing. Hit testing is the process of taking a specified device point and determining if it is within a minimum specified distance from a point on a geometry. Data can be specified indicating on what portions of the geometry or how near, a hit is detected and a tolerance describes the distance from the point allowed to qualify as a hit. Hits are tested for by a user in device space specifying a test point and reverse transforming to the local space for comparison to locations on the geometries in the local space.

Figure 11A:
FIGS. 11(a)-11(b) illustrate geometrical operations being performed on two defined shapes in accordance with the present invention.
Figure 11A:
Figure 11A:
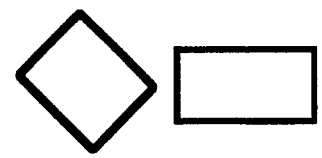
Figure 11A:
Figure 11A:
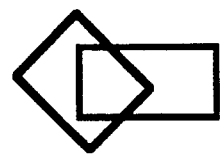
Figure 11A:
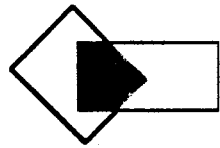
Figure 11A:
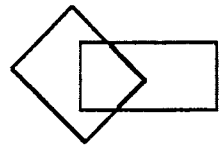
Figure 11A:
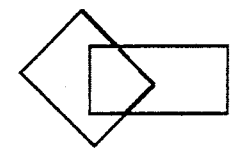
Figure 11A:
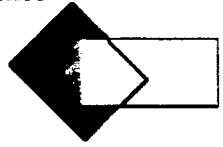
Figure 11A:
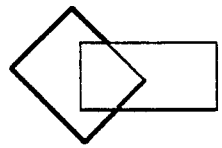
Figure 11A:
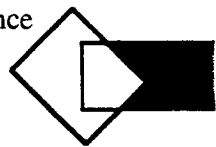
Figure 11A:
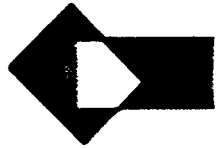

Another advantage to using a geometrical-based system, is that shapes and transforms can be combined with the operations of union, intersect, difference and xor. The operations take the form: A = A operation B. FIG. 11(a) shows the results of operating on defined shapes with varying frame and fill types with these operators. Note that not all of the combinations of shape types make sense.

Figure 11B:
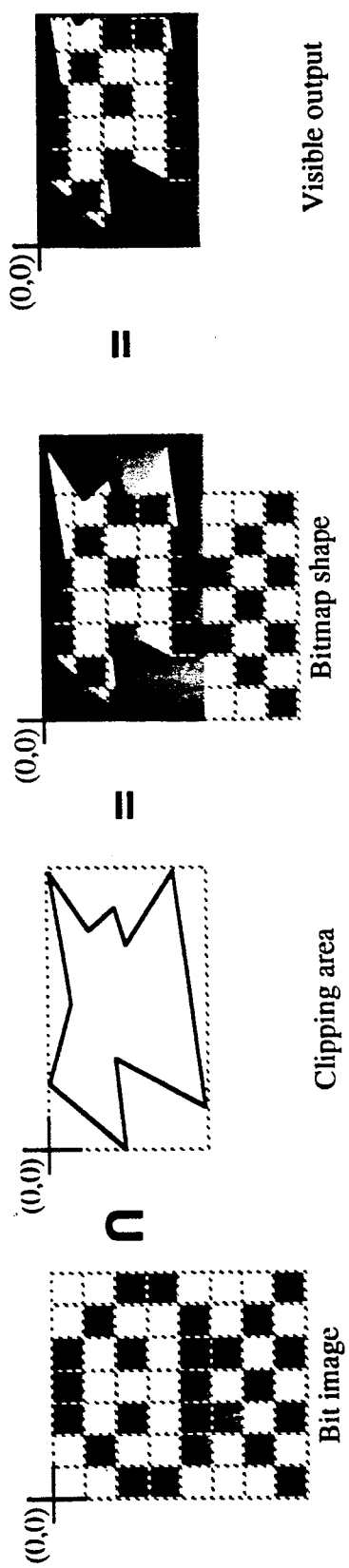

Operations on bitmaps require special treatment. Combining a bitmap and a geometry is implemented by combining the bitmap's clip with the geometry after finding the minimum enclosing rectangle of the two. Clipping a bitmap creates an irregular bound subset of the original image. This is shown as FIG. 11(b).

Referring back to FIG. 2 the data structure for taking a locally defined shape and rendering it to device space is described with respect to the view group data 250. View groups define the global space in which viewports and view devices reside. A view group matches one or more viewports with a family of view devices they might intersect. They allow multiple sets of global spaces to be defined for the purposes of sharing and separating viewports and view devices.

Within the view group data structure 250, the viewport data structure 252 is maintained. A viewport is an association of the mapping and clipping from local coordinate space to global coordinate space. A shape is defined in local coordinate space. Local coordinate space is unbounded by windows, and the values of the coordinates serve only to define the shape with respect to itself, they are not tied to a specific metric. A transform gives different shapes meaning with respect to each other. All shapes showing the same transform are drawn to the same scale. A viewport contained in the viewport list maps the local coordinate space in which the shapes are defined to the global coordinate space of the view group, in which viewports and view devices are defined.

Figure 12A:
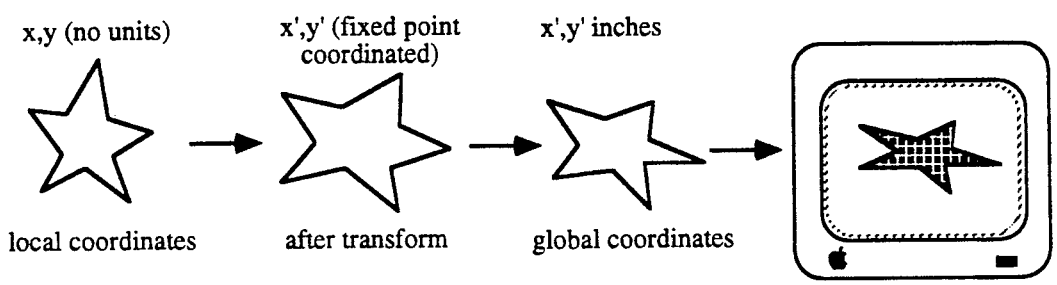
FIGS. 12(a)-12(b) illustrate the processing of an image from a defined shape to a display image in accordance with the present invention.
Figure 12B:
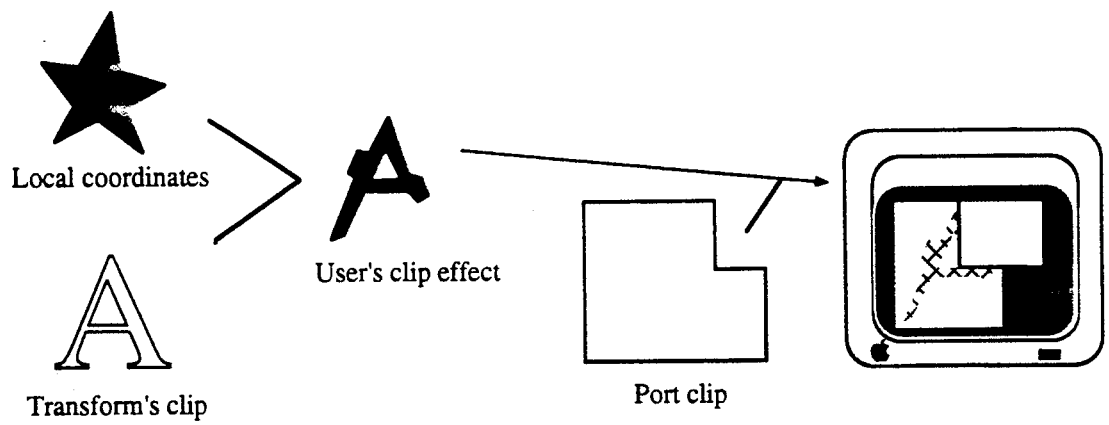

FIG. 12(a) shows a simple encapsulated geometry transformed from local space to a global space and then to a view device. FIG. 12(b) shows the effect of clipping in this arrangement. The transform, in addition to determining the mapping of local coordinates to the global coordinates, specifies the local clip, and through their viewport list, the global clip.

Therefore, a shape may be directed to two viewports, but because each transform contains a mapping, clip, color space and view device, the rendered object in the two viewports can look very different. The viewport mapping defines translation, scaling, skewing, rotation and perspective. The clip defines a clipping geometry in global space. And the view device specifies the physical monitor or printer where the drawing occurs. Viewports may overlap, and the same view device can show more than one viewport. This flexibility makes it easy to implement split screens or drawing to simultaneous full-page views and editing views.

The viewports can exist in a hierarchy, allowing the creation of effects such as windows within windows, multiple windows within a window in a straightforward way. A viewport can have one other viewport as a parent. If it does, it is considered a child of that parent. A viewport that has no parent, together with all its children and their descendants, is a viewport hierarchy. A viewport's mapping and clip are concatenated with those of its parent. The viewport's clip is expressed in a coordinate of its parent; that is, it is affected by the parent's mapping, but not by the mapping of the viewport itself. The implication is that a viewport will encompass a subset of the pixels of its immediate parent, either on exactly those view devices that its parent does, or on a subset of those view devices. A change to the mapping clip of a viewport will affect all drawing that happens within the area of that viewport equally, whether the shapes within that area are drawn directly to the altered viewport or to a child of that viewport.

Figures 13A, 13B:
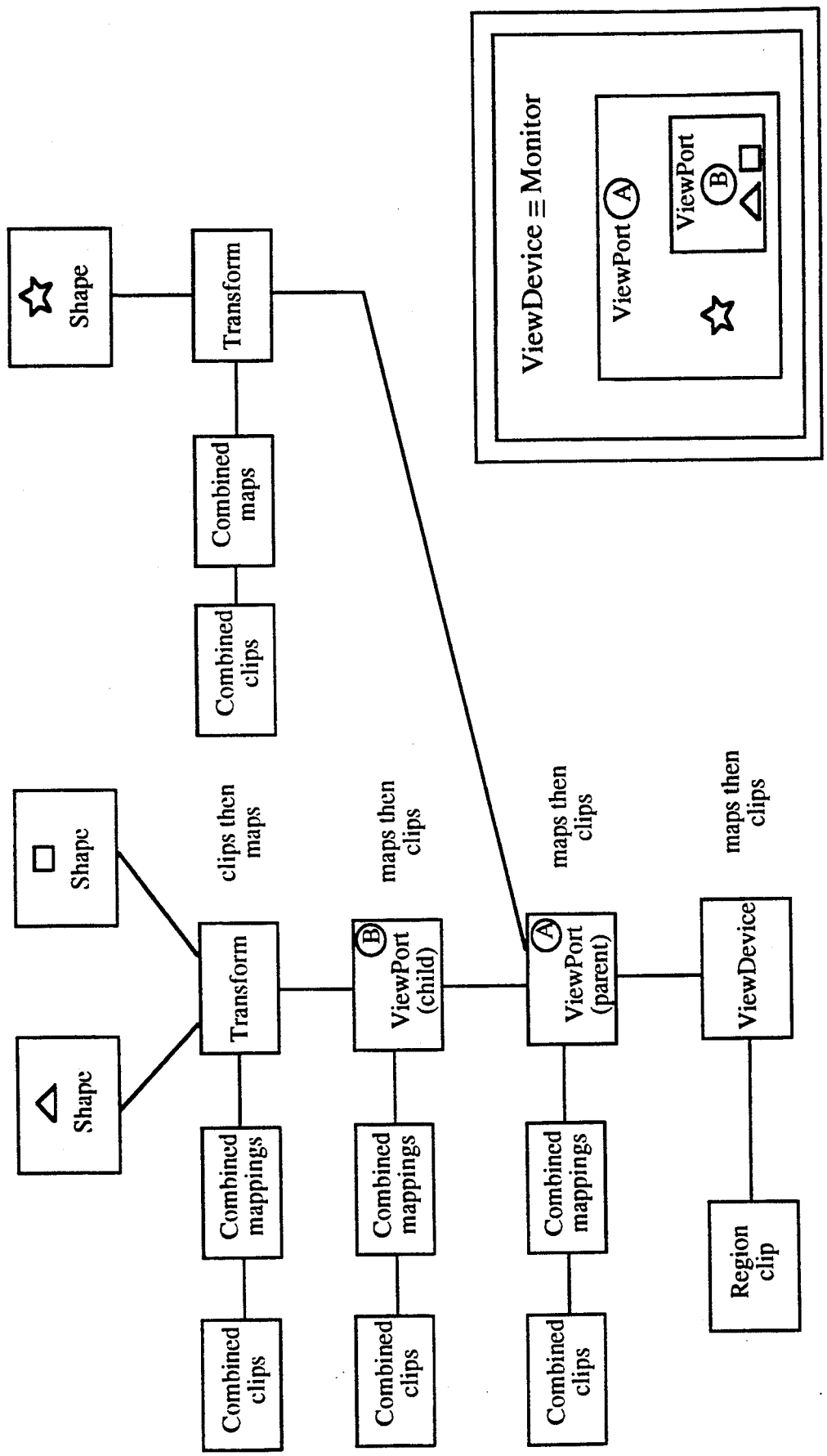
FIGS. 13(a)-13(b) illustrate the data structure associated with defining hierarchical output of various image components.

FIG. 13(a) shows the data arrangement for defining the hierarchical output of the triangle, square and star shown in FIG. 13(b). The geometry goes through a series of clipping and mapping operations before it is drawn. If one of the objects was a picture rather than a shape, another layer of clips and maps would be applied. In the example of FIG. 13(a), since graphics objects are shared, at each level in the hierarchy the combination of clips and maps below it is calculated and cached. When the shape is drawn, it is clipped and mapped by only the transform's cache. FIG. 13(a) can be contrasted with FIG. 3. The data definition of FIG. 3 pointed to multiple viewports in which the drawing would occur. As defined in FIG. 13(a), the drawing is to a single viewport, but that viewport is inside a second viewport. This illustrates the parent-child hierarchical arrangement of viewports.

The final data structure within the view group 250 is the view device data definition area 254 concerning view devices. A view device may describe a physical device, or an off-screen representation of a physical device. A view device also contains a mapping, clip, color space and a bitmap structure that points to the bit image modified by the drawing. The view device mapping defines translation, scaling, skewing, rotation and perspective. The mapping defines where the view device is located in global space. The clip defines a clipping geometry in the view device space in correspondence with the pixels of the view device. The clip may normally be rectangular, and is the same shape as the bitmap structure's width and height. The color space describes the color data of the pixel value. The color space may be a collection of colors, a color set, or a 16 or 32 bit representation of color. The bitmap describes the dimensions of the view device, the pixel depth and the location of the bit image. The upper left corner of the bitmap is at (0,0) in the preferred embodiment device space.

A new view device can be created that includes a bit image that is not connected to any hardware display; this bit image is an off-screen bitmap. Off-screen bitmaps typically mirror hardware devices, but are not required to do so. To draw to an off-screen bitmap, the user associates a viewport to map local coordinates into the newly created devices global coordinates. Typically, the application would specify that the global coordinates do not overlap with any hardware devices coordinates, so the drawing to the off-screen bitmap has no visible effect. To copy the off-screen bitmap to a visible screen, the user creates a bitmap shape from the new view device and draws it.

As an example of the present invention being applied for rendering, reference will again be made to FIGS. 12(a) and 12(b). The star shape shown in the left portion of FIG. 12(a) is first defined as a polygon by calling the routine NewPolygons by specifying the number of points and the coordinates of the points in local geometry space. This information occupies the geometric cache associated with the shape object data 210. As discussed above, a polygon describes the number of points and the points themselves, but does not describe the lines connecting the points. Thus, the fill portion of the shape object data 210 describes whether the defined shape is an open frame or closed frame by a call to a routine SetShapeFill. Here, the star shown in FIG. 12(a) describes a closed frame, thus a line connects the last specified point of the polygon to the first.

Once the shape has been defined in terms of a geometric structure with fill characteristics, the information for the shape's style data may be specified by calling a routine SetShapeStyle. It is at this point that dashing and patterns would be defined. Further, joins, indicating what shape is to appear at each line intersection would also be assigned at this time as well as other attributes described above with respect to the shape's style object data 220.

The defined shape object data 210 will also be associated with a shape transform object 230. This data structure can actually be shared by all shapes using the same transform. The transform cache maintains the mapping matrix for the translation, scaling, skewing, rotation, perspective or a combination of them. The star in FIG. 12(a) shows the result of a mapping operation that consists of scaling and rotating. Another characteristic stored in a given transform's object data 230 is the transform's clip definition. FIG. 12(b) shows a shape defined as a star similar to the one defined in FIG. 12(a) only having a different fill characteristic.

Additionally, the transform of FIG. 12(b) is shown to have a defined clip that is a box-letter capital 'A'. The image that remains stored at the geometric level is the intersection of the defined shape with its style attributes and the clip which defines the portion of the shape that will be displayable as shown by the partially stylized 'A' appearing in FIG. 12(b).

The above described definition of a shape in terms of its geometry, style and transform all take place in a local geometry space. The data for the shape is maintained at this level. All geometrical manipulations are performed on the geometries in the local space rather than on final rendered images. This allows for manipulation of images regardless of the display device's ultimate resolution without losing geometrical information as results once images are rendered and maintained as bitmaps.

The present invention is compatible with specifically designed graphics hardware or implemented on a general purpose digital computer. The final rendering to a device space, the last step in the output hierarchy, will depend upon the physical configuration of the device upon which the present invention is implemented. Many such devices are well known in the art.

Processing Logic for the Present Invention

The present invention includes computer program logic for processing information to be displayed on computer output devices. This logic is described for an example shape in the following section and in FIGS. 14-19. The example that is described with respect to FIGS. 14-19 results in a a triangle being drawn in a viewport hierarchy that overlaps two view devices. What is described is the processing logic for drawing the triangle figure into a viewport hierarchy on two specified view devices.

Figures 14A, 14B:
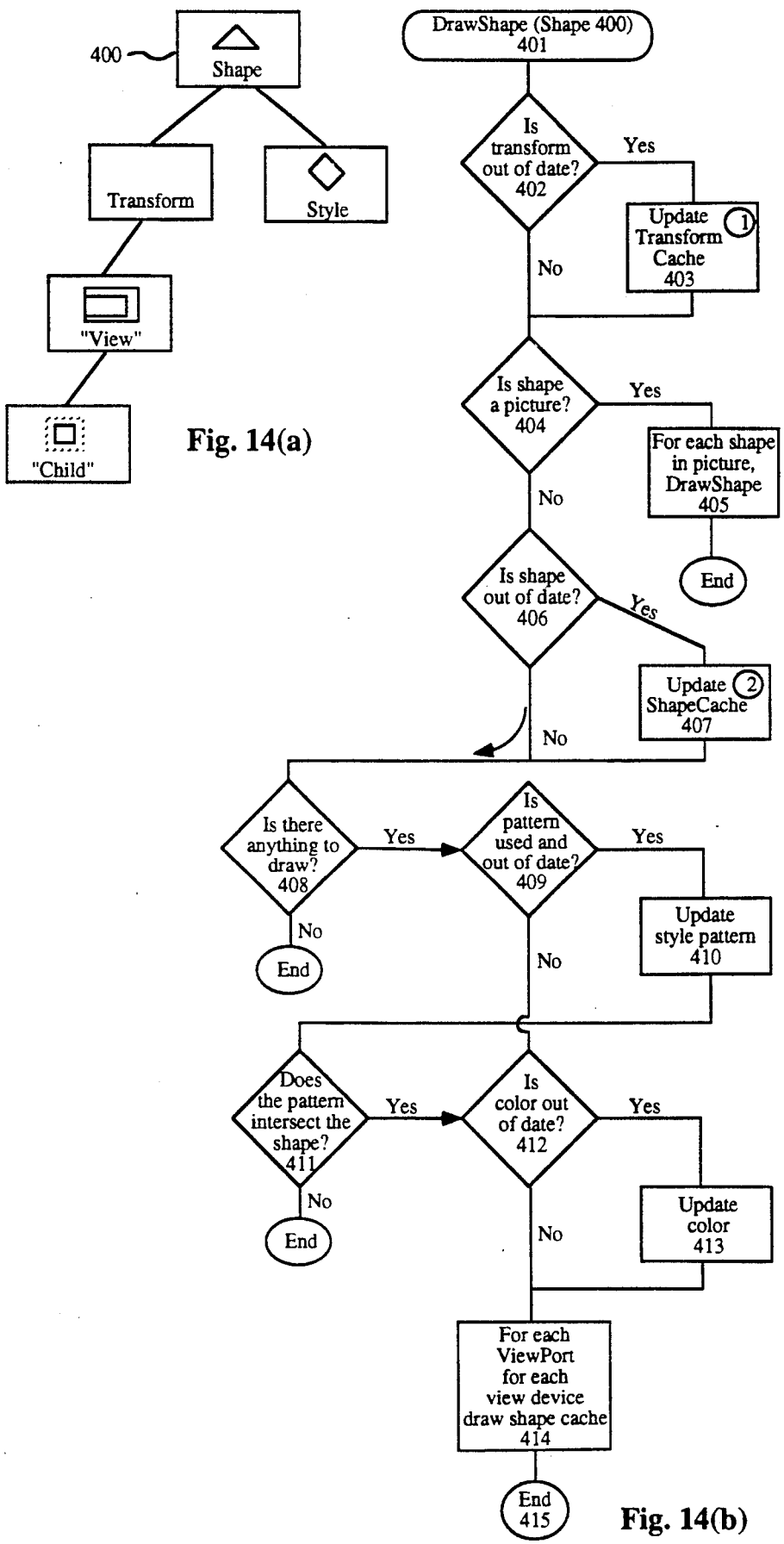
FIGS. 14-19 are flowcharts illustrating the processing logic for the present invention.

FIG. 14(a) graphically shows a shape 400 which references a style and transform which in turn hierarchically references a viewport and a child of that viewport in which the shape 400 will be drawn. In the example of 14(a), the shape is described by a polygon geometry and a thick pen. As described above, to define a polygon calls to routines will be made which specify the points defining the geometry and calls to other routines which define the shape's style. Still other routine calls are made for defining the viewport hierarchy and specifying output view devices.

Once the shape 400 has been defined, drawing the shape requires a call to be made to a routine DrawShape. FIG. 14(b) shows the flowchart for the logic of routine DrawShape. At the box labeled 401, the routine DrawShape is defined for receiving a parameter identifying the shape 400 which is to be drawn. Upon calling the routine DrawShape, a test 402 is performed to determine whether or not the shape's transform is current. If the transform is out of date, then a call is made at box 403 to the routine UpdateTransformCache which will be described with respect to FIG. 15 further herein. When the transform is current the next step in the routine DrawShape is the decision box 404 for determining if the shape is a picture. If the shape is determined to be a picture at decision box 404 then at box 405 the routine DrawShape 401 is called for each shape in the picture, thereby providing for the drawing of a hierarchy of shapes. If the shape is not a picture at decision box 404 then routine DrawShape proceeds to carry out the process for drawing the shape.

Once it is determined that the shape being drawn by the routine DrawShape is not a picture, but a single shape, the next step in routine 401 is to determine if the shape is out of date at decision box 406. If the shape is out of date then a call is made to the routine UpdateShapeCache at box 407 which will be described with respect to FIG. 16. After establishing that a current shape is to be drawn, decision box 408 determines if there is anything actually to be drawn. If there is not, the routine halts. If it is determined that there is something to draw at decision box 408 then at decision box 409 it is determined whether or not a pattern is used and if so, whether it is current. If a pattern is being used and is out of date then the style pattern is updated at box 410. Decision box 411 tests to see whether the pattern intersects the shape and if not, the routine halts. If the pattern does intersect, or if no pattern is being used, then at decision 412, it is tested to see whether the color is current and if not it is updated at routine step 413. Finally, at step 414, for each viewport and for each device for which there is a drawing cache for the shape, the cache is drawn. The routine DrawShape 401 ends at step 415. The cache for each device to which the shape is drawn maintains the parameters required for generating a bitmap for the particular shape on the specified view device.

Figures 15A, 15B:
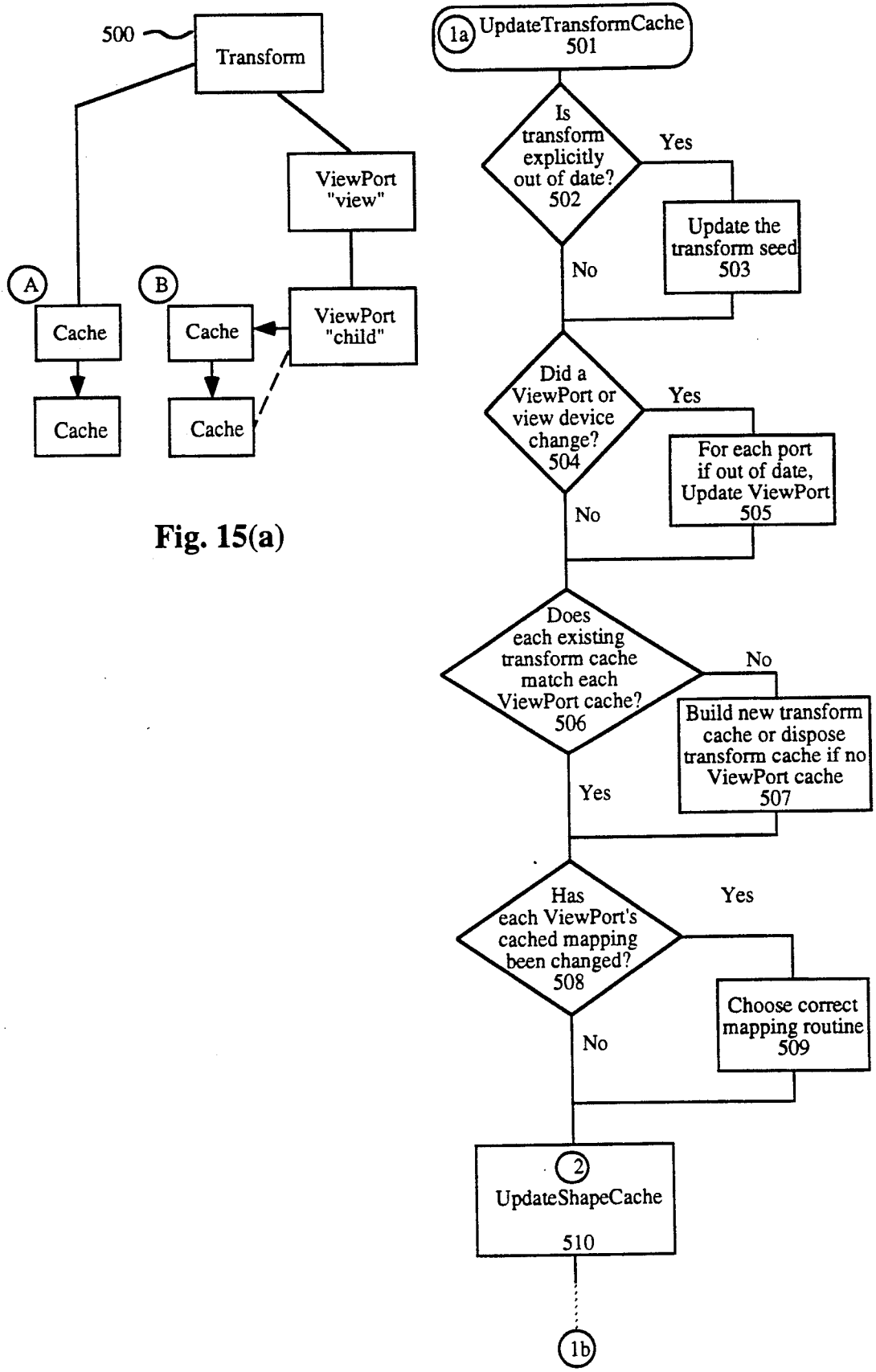

At step 403 of the routine DrawShape 401, it was necessary to update the transform cache because it was out of date. This was done by making a call to the routine UpdateTransformCache. This routine will be described with respect to FIG. 15. FIG. 15(a) shows a transform structure that references the output caches corresponding to shape caches in accordance with the present invention. The transform references a first viewport labeled "view" which is a parent to the viewport "child" in the viewport hierarchy. The child viewport is shown referring to two caches. One is maintained for each view device that the viewport is drawn to if it crosses a view device.

Figure 15C:
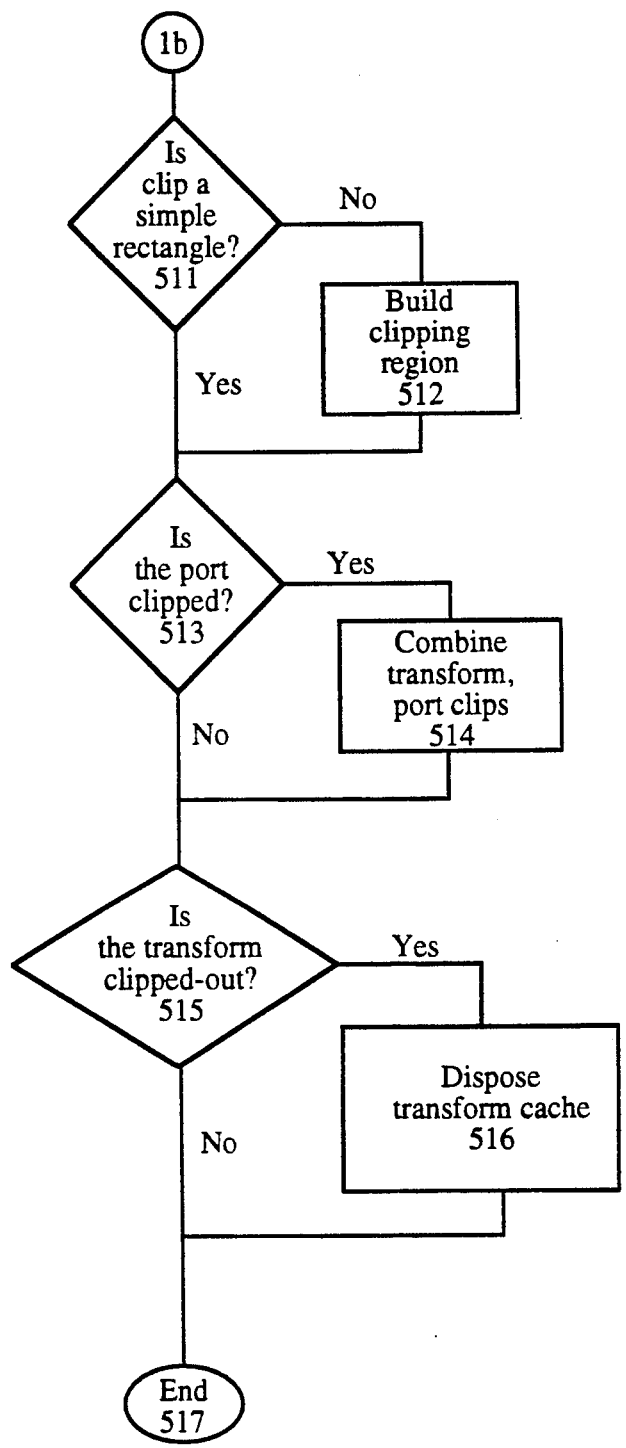

FIGS. 15(b) and 15(c) show the flowchart for the processing logic for updating a transform. The call to the routine begins at box 501 labeled UpdateTransformCache. First, at decision box 502, it is determined if the transform is explicitly out of date which results if the transform itself has changed and not something that references it. If it is, then the transform's seed is updated at box 503. The transform's seed is an indicator of how current the transform is. Next, it is determined at decision box 504 whether or not a viewport or view device has changed. If so, then at box 505 the routine UpdateViewport is called which will be described with respect to FIG. 18. Then it must be determined at decision box 506 whether each existing transform cache matches a corresponding viewport cache. If not, then at step 507 a new transform cache is either built or disposed of if there is no corresponding viewport cache. At decision box 508 it is next determined whether or not a viewport's cached mapping has in any way been changed. If so, then at step 509 a correct mapping routine is chosen as is described in the next section. After the transform mapping has been corrected then a call is made to UpdateShapeCache at box 510 which is described with respect to FIG. 16 further herein.

Once the shape cache has been updated with the new transform mapping information, the routine 501 continues as shown in FIG. 15(c). This next part of the routine processes the clip information for the transform. First at decision box 511, it is determined if the clip is a simple rectangle. If it is not, then a clipping region is built at box 512. Next, it is determined if the viewport itself is clipped at decision box 513. The port clip is actually the cached viewport clip in the device-specific viewport cache which is generated by the UpdateViewport routine which will be described with respect to FIG. 18. If the port is clipped at decision box 513, then at step 514 it is necessary to combine the transform and port clips. Next, at decision box 515, it is determined whether or not the transform is clipped-out. That is, is there anything left to be displayed after applying the clip? If it is clipped-out then the transform cache is disposed of at box 516. The above series of routines is repeated for each viewport that the shape is to be drawn to.

Figure 16:
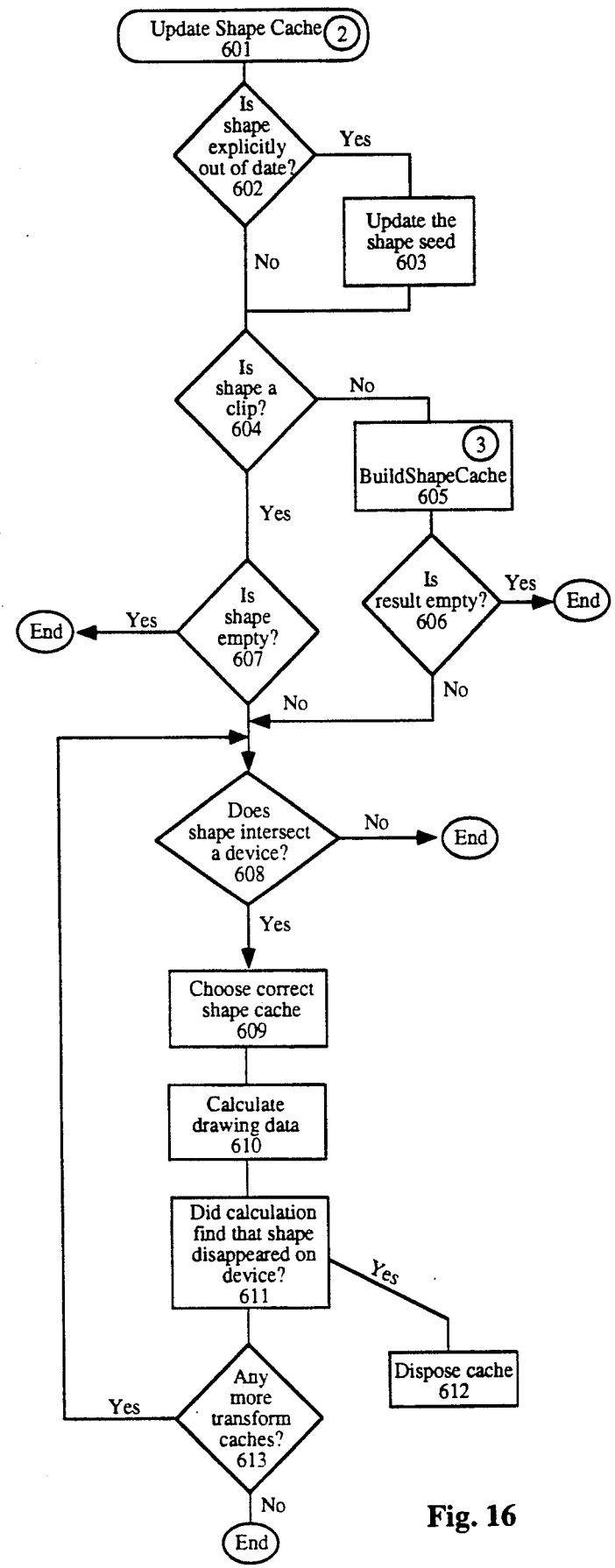

Referring now to FIG. 16, the routine UpdateShapeCache is described with respect to the flowchart shown. The procedure begins at box 601 labeled UpdateShapeCache. The purpose of this routine is to make current the shape's associated caches when anything has changed because caches are only updated or created when needed. First, at decision box 602, it is determined if the shape is explicitly out of date. If it is, then at box 603 the shape seed is updated. If the shape is not explicitly out of date or once the shape seed has been updated, it is next determined at decision box 604 whether or not the shape is a clip. If the shape is not a clip then it is necessary to call the routine BuildShapeCache at box 605 which will be described more fully with respect to the flowchart of FIG. 17. Once the shape cache has been built, if the result is an empty shape at box 606 then the routine UpdateShapeCache ends. Likewise, if the shape is a clip but it turns out to be empty at box 607, the routine ends.

The remainder of this routine is iterated for each of the transform caches shown under label A of FIG. 15(a). At decision box 608, it is determined whether or not the shape intersects a view device. If it does not, the routine ends because the shape will not be drawn. The test at 608 is against the mapping routine that was chosen in the routine UpdateTransformCache which was described with respect to FIG. 15. If the shape does intersect a device then at box 609, it is necessary to choose the correct shape cache based on the shape geometry and fill. At box 610, the drawing data for the shape to that view device is calculated, again, using the mapping routine chosen in the previously described UpdateTransformCache. Finally, at decision box 611, it is tested for whether or not the shape disappears on that device. For example, it tests to see if it is drawn to a viewport that winds up being behind another viewport. If so, then the cache is disposed of at box 612 because there is nothing to draw. Decision box 613 causes the routine from 608 to 612 to be repeated for each transform cache which is maintained for each drawn instance of the shape.

Figure 17:
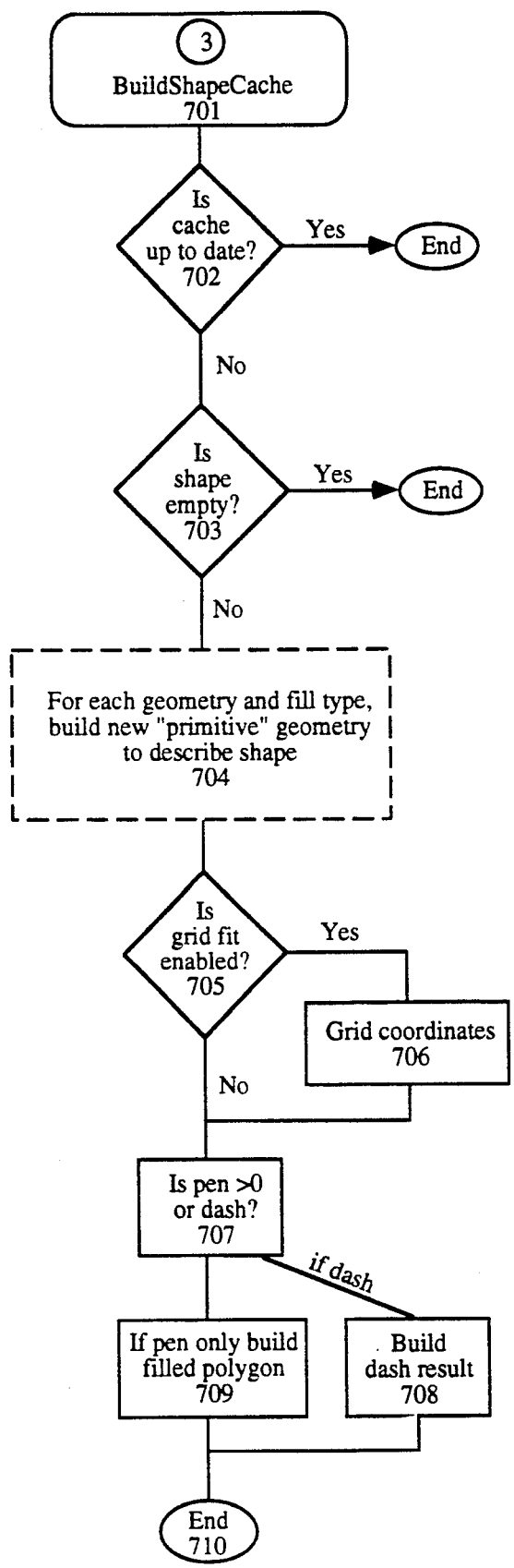

FIG. 17 shows a flowchart describing the processing logic for the routine BuildShapeCache which was called at box 605 of FIG. 16. The routine begins at box 701 labeled BuildShapeCache. The first step at boxes 702 and 703 is to determine whether or not the cache is up to date and whether or not the shape is empty. If the cache is up to date or the shape is empty, the routine ends because it is not necessary to build a cache for the shape. If it is necessary to build the shape cache, then at box 704 for each geometry and fill type a new "primitive" geometry is created which describes how the shape will be drawn. Then, at decision box 705 if grid fitting is enabled then at box 706 grid coordinates are applied. Boxes 707, 708 and 709 then determine whether or not styles need to be applied to the geometry for the shape and, if so, they are.

Figure 18A:
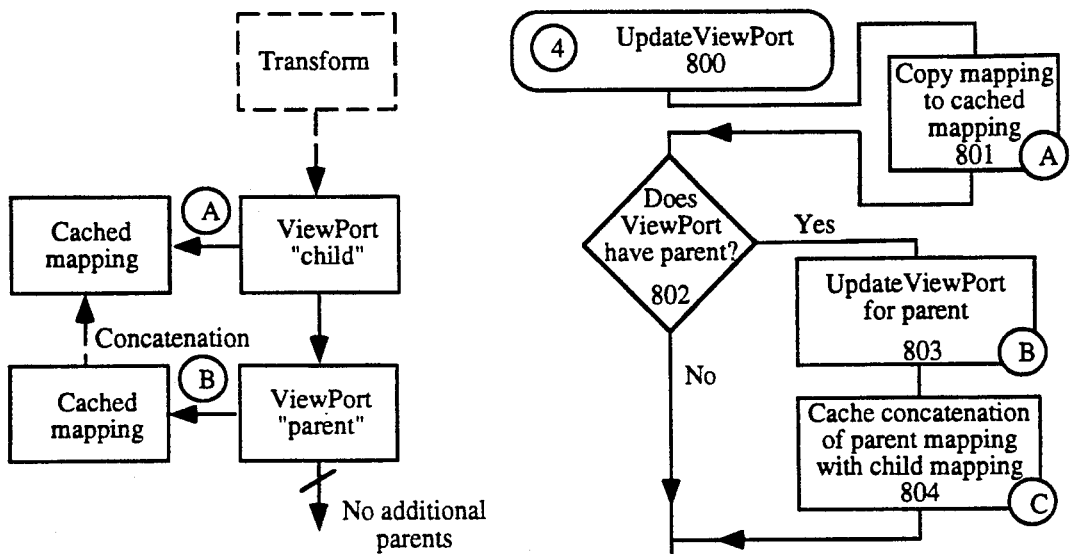

In the routine described in FIG. 15, it was sometimes necessary to call a routine UpdateViewPort when a viewport or a view device had changed. FIG. 18 illustrates the process for updating viewport information where hierarchical viewports have been defined. FIG. 18(a) graphically illustrates the viewport references made by a transform and the viewport's associated caches. In this figure it is made clear that a child viewport's mapping is affected by its parent's mapping.

Figure 18B:
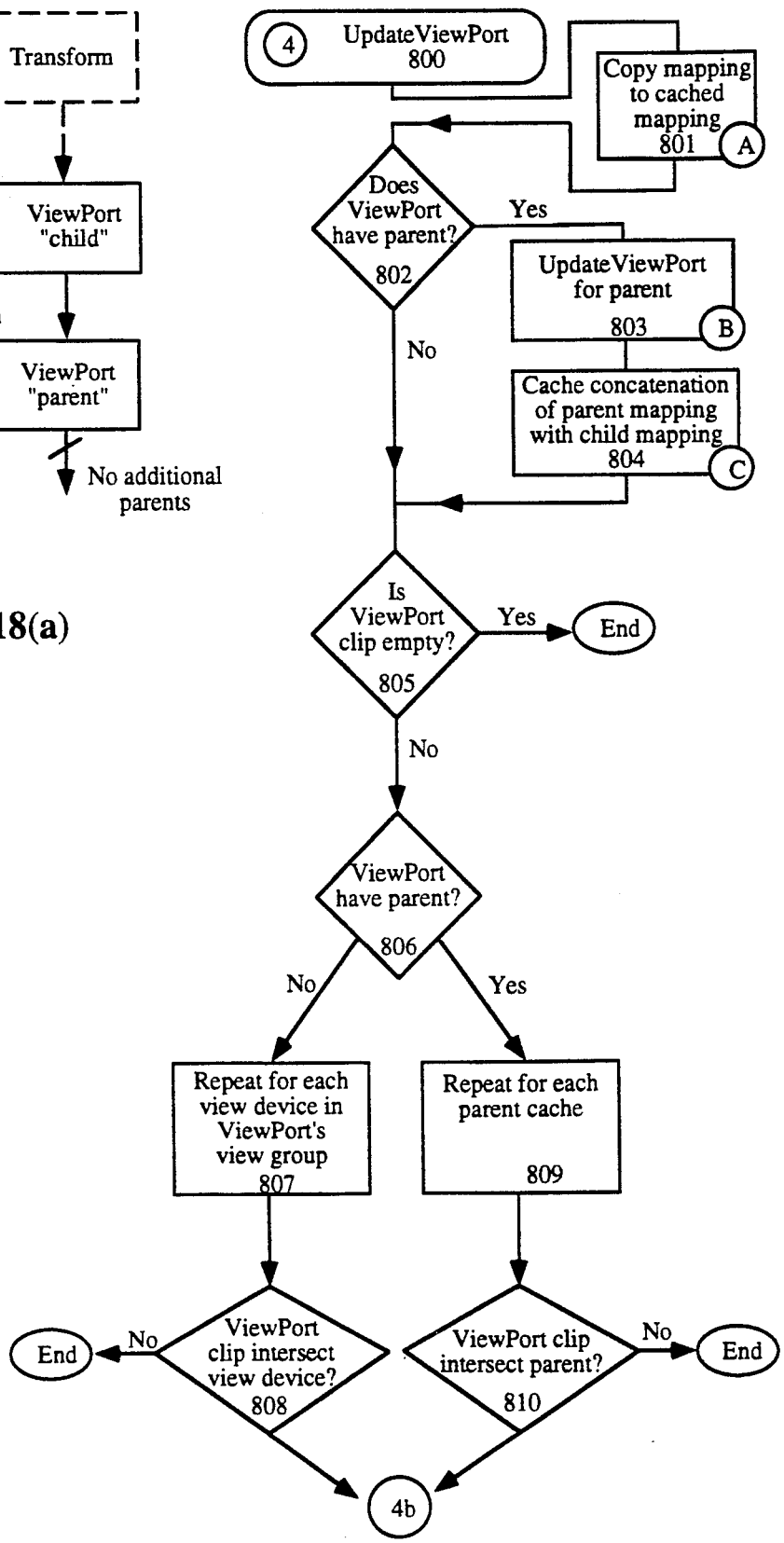

FIG. 18(b) shows a flowchart of the processing logic for updating viewport information. The process begins at box 800 labeled UpdateViewPort. The first step at 801 is to copy the viewport's defined mapping to a cached mapping shown as step A in the graphical illustration FIG. 18(a). Next at decision box 802 it is determined whether or not the viewport being updated is the child of another viewport. If so, then the routine branches to step 803 where a call to the UpdateViewPort routine 800 is made for the parent viewport. It is this recursiveness that allows viewports to be hierarchically arranged. Once the parent viewport has been updated, step 804 concatenates the current viewport's mapping with its parent's mapping. The result is then cached for the child viewport, shown as step C in the graphical illustration FIG. 18(a).

In FIG. 18(b), after the viewport's mapping has been cached, it is next determined at decision box 805 if the viewport's clip is empty. If it is, the routine ends. If the viewport's clip is not empty, the routine proceeds to decision box 806 which determines if the viewport has a parent. If the viewport does not have a parent then beginning at step 807 the remaining steps of the procedure are iterated for each view device in the viewport's view group. At decision box 808, if the viewport's clip does not intersect the current view device being checked, then the routine ends. Thus, if the viewport does not have a parent and its clip does not intersect any of the view devices to which it is directed, the routine ends. If at decision box 806 it was determined that the viewport had a parent, then beginning at step 809 the remaining steps of the procedure are repeated for each parent. The test at decision box 810 tests whether viewport's clip intersects the parent for each parent cache. If it doesn't, the routine ends.

Figure 18C:
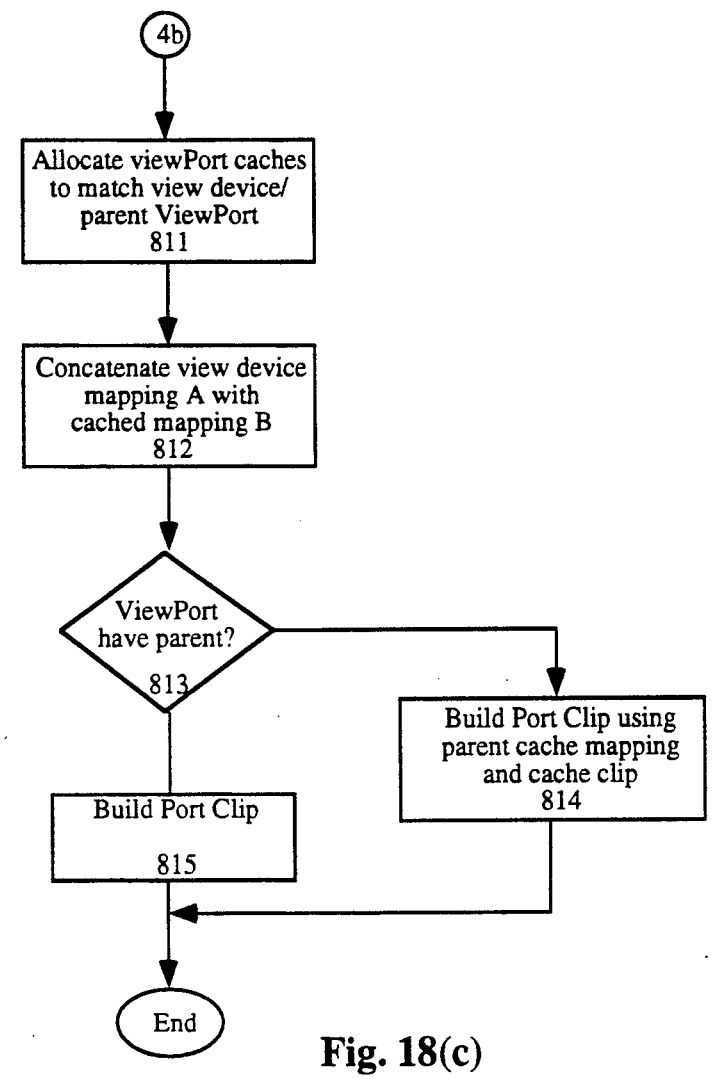
Figure 18D:
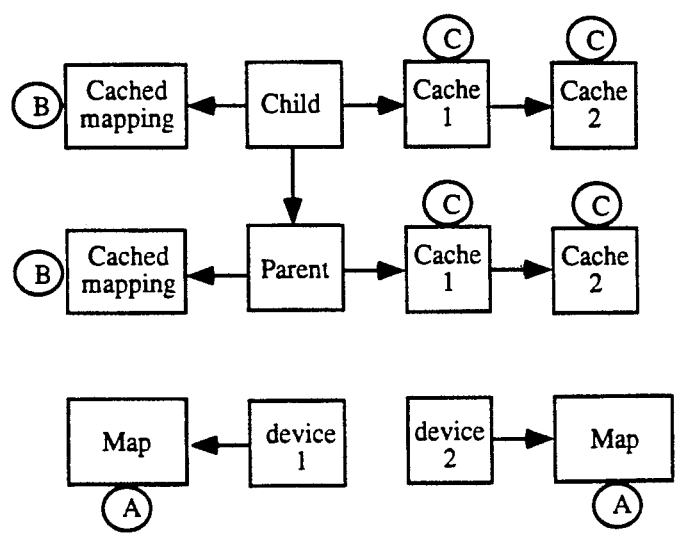

Once it has been established that the viewport's clip will be output to a view device, the routine 800 continues for each of the above iterations as shown in FIG. 18(c). FIG. 18(d) shows the graphical hierarchy and caching arrangement for the process described with respect to FIG. 18(c). FIG. 18(d) shows the caching arrangement for the present example where the child viewport has a single parent and will be drawn over two view devices. Each view device has a mapping A. Each viewport has a cached mapping B and will have caches C corresponding to each view device to which it will be drawn. The recursive calls to UpdateViewPort and the loop through all view devices or parents causes the four caches C to be built by the following steps:

The routine 800 continues at step 811 of FIG. 18(c) where the viewport caches are allocated to match a view device or parent. All non-matching caches are disposed of for being obsolete. At step 812, for each of the above-described iterations, the view device mapping A is concatenated with the cached mapping B. The result is stored in the cache C which corresponds to the view device for the current iteration. Finally, beginning at step 813, the viewport's clip is built. If the viewport has a parent then at step 814 the viewport's clip is built using the parent's cached mapping and cached clip. If the viewport does not have a parent then its clip is built using the view device's mapping and clip at step 815. The first time UpdateViewPort is called, the parent's clip region is built and is intersected with each view devices clip region. This is stored in the parent viewport's clip cache. When UpdateViewPort is called for the child viewport, the child's clip region is built and is intersected with the parent's clip region. This result is stored in the child viewport's clip cache. After all iterations for parents and view devices of the viewport, the routine 800 ends.

Figure 19:
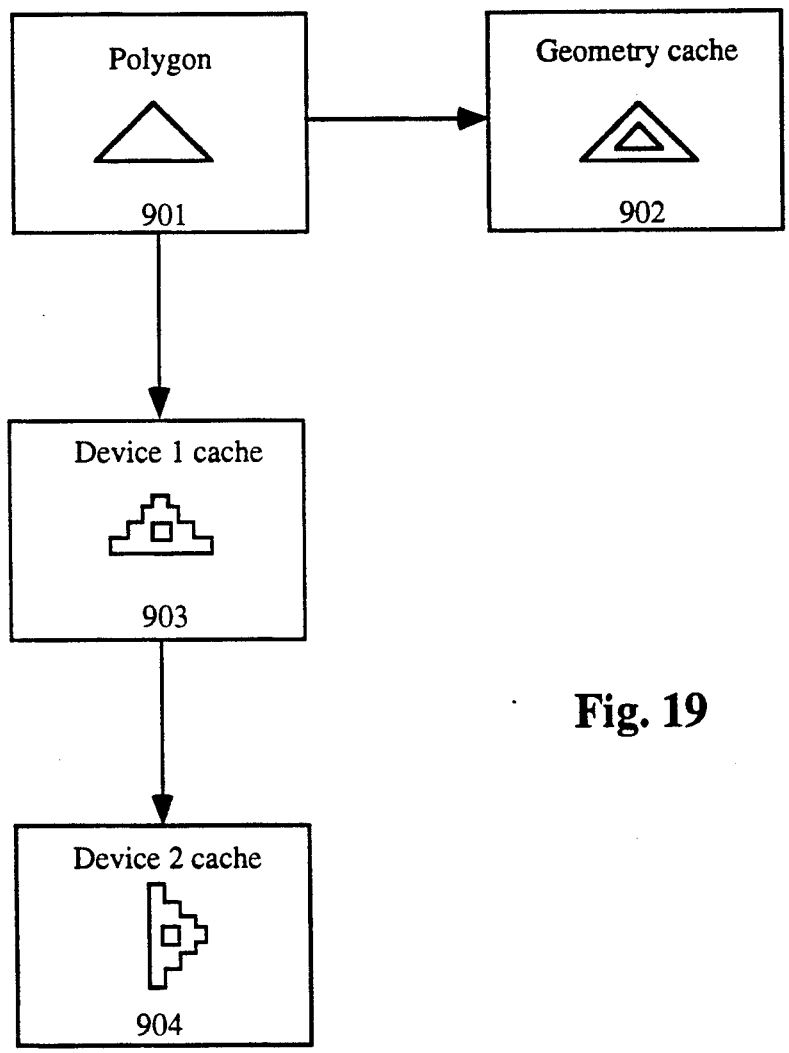

FIG. 19 shows a graphical representation of various caches that may be maintained for a shape which provide different levels of detail about the shape. These caches may be built for drawing or they may be built when a request for information they would contain is executed. Thus, caches may be built for reasons other than drawing, but they need not be built until they are required. The information shown in FIG. 19 corresponds to the example described with respect to the flowcharts of FIGS. 14-18.

The information shown at 901 contains the geometry's bounds, whereas at 902 the information obtainable concerns the geometry as described by its style and transform in local coordinates. The device caches 903 and 904 can be created for drawing or if information is required concerning the pixel bounds affected by the drawing. Note that the device caches need not contain the bitmaps as shown, but merely parameters required to generate the bitmap.

Although the present invention has been described in terms of a preferred embodiment methodology, it will be appreciated that various modifications and alterations might be made by those skilled in the art without departing from the spirit and scope of the invention. The invention should, therefore, be measured in terms of the claims which follow.

What is claimed is:

1. A method for generating and manipulating graphical data for display on a computer output device, said method comprising the steps of:
   defining a first geometric object in a local geometry space;
   performing all geometric manipulations to said first geometric object to generate results in said local geometry space;
   selectively caching the results of said geometric manipulations for later reference;
   defining a first shape based on said cached results of said geometric manipulations to said first geometric object;
   translating geometrical information of said first shape from said local geometry space to a global view space for output to one or more viewports and caching the results of the translation, said translating step comprising the steps of:
      defining for said one or more viewports a mapping and clipping characteristic; and
      applying said viewport mapping and clipping characteristic to the transformed shape information in said local geometry space to yield the graphical data for the global space; and
   rendering an image of said first shape from said local geometry space to one or more device spaces for outputting a graphical representation of said graphical information on a computer display device and caching the graphical information for rendering said image to said one or more device spaces.

2. The method of claim 1 wherein said first geometric object comprises at least one selected from the group consisting of a point, line, rectangle, curve, polygon, path, text, glyph, or bitmap.

3. The method of claim 1 wherein said shape defining step further comprises the steps of:
   specifying style data for said shape; and
   specifying transform information for said shape in said local space.

4. The method of claim 3 further comprising the step of defining and caching a second geometric object in said local geometry space by applying said style data to said first geometric object to yield said second geometry.

5. The method of claim 3 wherein said style specifying step further comprises the steps of:
   specifying a dashing characteristic for said shape when said style data includes dashing information;
   specifying start and end caps for said shape when said style data includes capping information;
   specifying a join characteristic for said shape, when said style data includes joining information;
   specifying a pattern characteristic for said shape, when said style data includes pattern information; and
   specifying a pen size and pen orientation for said shape when said style data includes pen information.

6. The method of claim 3 wherein said transform specifying step further comprises the steps of:
   defining a mapping for said shape; and
   defining a clip for said shape, both to be maintained in said local space.

7. The method of claim 6 wherein said mapping step comprises defining elements of a three-by-three matrix for specifying mapping characteristics of the image in said local geometry space.

8. The method of claim 1 wherein said step of performing geometrical manipulations comprises the steps of either union, intersect, difference, or xor operations with another specified shape, a solution of which is maintained as a shape in said local geometry space.

9. The method of claim 1 wherein said step of performing geometrical manipulations comprises the steps of either inverting said shape by defining all area not included in said shape or simplifying said shape by removing any overlapping structure from said shape.

10. The method of claim 1 further comprising the step of defining a plurality of viewports in a hierarchical arrangement wherein succeeding viewports in the hierarchy are subject to the mapping and clipping characteristic of the preceding viewport in the hierarchy.

11. The method of claim 10 wherein said rendering step to a physical device comprises the steps of:

defining a mapping and clipping and for a desired view device;

applying said view device mapping and clipping information to the global space data for generating a bitmap image of said graphical information; and outputting said bitmap to said computer output device.

12. The method of claim 1 wherein said caching steps comprises the steps of:

determining if the cache already exists and is current for the information to be cached; and iterating for each viewport and view device that the image is to be drawn to and for each, building a cache comprising a concatenation of mapping and clip information for the preceding caches in a hierarchy with the mapping and clip information for a current iteration level.

13. A computer display system comprising:

display means for providing a display comprising a plurality of raster scan lines including a plurality of display elements, each of said display elements being selectively enabled;

memory means for storing a hierarchy of data for specifying a geometrical object, its encapsulated shape, its style, and transform, as well as for caching geometrical information and for maintaining viewport hierarchy information and view device definitions wherein stored information in said memory means for a shape corresponds to pixel information for said display means;

input means for inputting a graphical image; and processing means coupled to said memory means and to said input means for enabling display elements which correspond to data in said hierarchy of data, and generating a defined image in accordance with hierarchical viewport and view device mappings and clippings said processing means further including logic means for executing logic operations between ordered lists of geometries in a defined local space.

14. The display system of claim 13 wherein said logic operations include union, intersection, difference, invert, simplify and xor.

15. A method for generating and manipulating graphical data for display on a computer output device, said method comprising the steps of:

defining a first geometric object in a local geometry space;

performing all geometric manipulations to said first geometric object to generate results in said local geometry space, wherein said step of performing geometrical manipulations comprises the steps of either union, intersect, difference, or xor operations with another specified shape, the solution of which is maintained as a shape in said local space;

selectively caching the results of said geometric manipulations for later reference;

defining a first shape based on said cached results of said geometric manipulations to said first geometric object;

translating geometrical information of said first shape from said local geometry space to a global view space for output to one or more viewports and caching the results of the translation; and rendering an image of said first shape from said local geometry space to one or more device spaces for outputting a graphical representation of said graphical information on a computer display device and caching the graphical information for rendering said image to said one or more device spaces.

* * * * *